US008751863B2

(12) United States Patent
Calder et al.

(10) Patent No.: US 8,751,863 B2
(45) Date of Patent: Jun. 10, 2014

(54) IMPLEMENTING FAILOVER PROCESSES BETWEEN STORAGE STAMPS

(75) Inventors: Bradley Gene Calder, Bellevue, WA (US); Niranjan Nilakantan, Redmond, WA (US); Shashwat Srivastav, Seattle, WA (US); Jiesheng Wu, Redmond, WA (US); Arild Einar Skjolsvold, Denmore, WA (US); Maxim Mazeev, Redmond, WA (US); Abdul Rafay Abbasi, Redmond, WA (US); Shane Mainali, Duvall, WA (US); Hemal Khatri, Redmond, WA (US); Ju Wang, Redmond, WA (US); Padmanabha Chakravarthy Uddaraju, Bellevue, WA (US); Leonidas Rigas, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 334 days.

(21) Appl. No.: 13/113,795

(22) Filed: May 23, 2011

(65) Prior Publication Data
US 2012/0303999 A1 Nov. 29, 2012

(51) Int. Cl.
*G06F 11/00* (2006.01)
(52) U.S. Cl.
USPC .......................................................... 714/6.3
(58) Field of Classification Search
USPC ........ 714/6.1, 6.12, 6.13, 6.2, 6.23, 6.3, 6.31, 714/6.32
See application file for complete search history.

(56) References Cited

U.S. PATENT DOCUMENTS

| 7,475,160 | B1 * | 1/2009 | Shah et al. .................... 709/242 |
| 7,657,718 | B1 | 2/2010 | LeCrone et al. |
| 8,001,079 | B2 * | 8/2011 | Lu et al. ........................ 707/616 |
| 8,341,455 | B2 * | 12/2012 | Maki et al. ................... 714/4.11 |
| 2007/0168692 | A1 | 7/2007 | Quintiliano |
| 2008/0162518 | A1 | 7/2008 | Bollinger et al. |
| 2008/0183991 | A1 * | 7/2008 | Cosmadopoulos et al. .. 711/162 |
| 2009/0222582 | A1 | 9/2009 | Josefsberg et al. |
| 2009/0320049 | A1 | 12/2009 | Thiel et al. |
| 2011/0078494 | A1 * | 3/2011 | Maki et al. ................... 714/6.12 |
| 2012/0030503 | A1 * | 2/2012 | Li et al. ........................ 714/4.11 |

OTHER PUBLICATIONS

U.S. Appl. No. 13/113,718, applicant Bradley Gene Calder, titled "Replication Processes in a Distributed Storage Environment" filed May 23, 2011, 55 pages.

(Continued)

*Primary Examiner* — Nadeem Iqbal
(74) *Attorney, Agent, or Firm* — Ben Tabor; David Andrews; Micky Minhas

(57) ABSTRACT

Embodiments of the present invention relate to invoking and managing a failover of a storage account between partitions within a distributed computing environment, where each partition represents a key range of data for the storage account. The partitions affected by the failover include source partitions hosted on a primary storage stamp and destination partitions hosted on a secondary storage stamp, where the storage account's data is being actively replicated from the primary to the secondary storage stamp. Upon receiving a manual or automatic indication to perform the failover, configuring the source partitions to independently perform flush-send operations (e.g., distributing pending messages as a group) and then configuring the destination partitions to independently perform flush-replay operations (e.g., aggressively replaying currently pending transactions). Upon completing the flush-replay operations, designating the secondary storage stamp as a new primary storage stamp such that live traffic is directed to the new primary storage stamp.

20 Claims, 12 Drawing Sheets

(56) References Cited

OTHER PUBLICATIONS

U.S. Appl. No. 13/113,702, applicant Bradley Gene Calder, titled "Synchronous Replication in a Distributed Storage Environment" filed May 23, 2011, 62 pages.

U.S. Appl. No. 13/113,634, applicant Bradley Gene Calder, titled "Geo-Verification and Repair" filed May 23, 2011, 30 pages.

U.S. Appl. No. 13/113,729, applicant Bradley Gene Calder, titled "Versioned and Hierarchical Data Structures and Distributed Transactions" filed May 23, 2011, 25 pages.

U.S. Appl. No. 13/113,808, applicant Bradley Gene Calder, titled "Storage Account Migration Between Storage Stamps" filed May 23, 2011, 68 pages.

U.S. Appl. No. 13/113,776, applicant Bradley Gene Calder, titled "Load Balancing When Replicating Account Data" filed May 23, 2011, 58 pages.

U.S. Appl. No. 13/113,688, applicant Bradley Gene Calder, titled "Asynchronous Replication in a Distributed Storage Environment" filed May 23, 2011, 52 pages.

Spencer, Cliff, "Wishing You a Speedy Recovery", Retrieved on: Dec. 30, 2010, 6 pages Available at: http://www.drj.com/drworld/content/w4_058.htm.

Thompson, et al., "ArcSDE to ArcGIS Server Basic", Retrieved on: Dec. 30, 2010, 19 pages Available at: http://www.gisuser.co.nz/downloads/arcsde%20to%20arcgis%20server%20basic.pdf.

"Configuring Geographically-Redundant Installations", Retrieved on: Dec. 30, 2010, 9 pages Available at: http://download.oracle.com/docs/cd/E13209_01/wlcp/wlss31/configwlss/georedundant.html.

"Placement of the File Share Witness (FSW) on a Geographically Dispersed CCR Cluster", Retrieved on: Dec. 30, 2010, 4 pages Available at: http://blogs.microsoft.co.il/blogs/dand/archive/2009/07/01/placement-of-the-file-share-witness-fsw-on-a-geographically-dispersed-ccr-cluster.aspx.

"Cross Datacenter cPanel Failover", Retrieved on: Dec. 30, 2010, 3 pages Available at: http://cpanelfailover.com/.

MS Tech Talk: "Geo-replication and Disaster Recovery", Retrieved on: Dec. 30, 2010, 2 pages Available at: http://social.msdn.microsoft.com/Forums/en/windowsazuremanagement/thread/a7eb2980-afd9-4999-8a99-21174aa0488a.

\* cited by examiner

IMPLEMENTING FAILOVER PROCESSES BETWEEN STORAGE STAMPS

BACKGROUND

Often, distributed environments rely on geographically separate components, which may be connected via a network, to perform data storage and manipulation (e.g., read, write, and modify). A customer of these distributed environments may desire to have data for their account(s) maintained in a particular geographic location while another copy of the data is stored in a separate, geographically removed location. For example, the customer may desire to have their data stored in two or more geographical locations that are separate from one another to reduce potential data-availability issues surrounding a natural disaster. Further, a customer may decide, on an account-by-account basis, to have data maintained and/or replicated in a variety of geographical locations. For instance, for some accounts, the customer may require a plurality of locations that are geographically diverse while, for other accounts, the customer may select a single geographic location to hold sensitive data, thereby favoring privacy over duplicity. With regard to this construct above, embodiments of the present invention introduce a system and methodology for maintaining storage-account data at geographically remote locations and for providing clean and/or abrupt failover techniques that facilitate re-designation (e.g., primary vs. secondary) of the data across the locations.

SUMMARY

Embodiments of the present invention relate to systems, methods, and computer storage media for identifying when to migrate storage-account data between nodes of a distributed computing environment and for carrying out failover operations on those nodes that are identified as candidates for participating within the failover. In one instance, the present invention introduces technology for invoking and managing failover operations applied to partitions within the distributed computing environment, where each partition represents a key range of data for a given storage account. The partitions affected by the failover operations are typically source partitions hosted on a primary storage stamp and/or destination partitions hosted on a secondary storage stamp. Generally, the primary and secondary storage stamps are equipped to act in concert to recover, at least a portion of, the storage account's data upon initiating a failover.

In an exemplary embodiment, the failover operations are generally related to transitioning a storage accounts data or a subset of its data on a secondary storage stamp, which is presently functioning as a data store, to be the primary storage stamp that is capable of providing read and write access to a client upon request to that data. As discussed herein, there are two distinct classes of failover: clean failover and abrupt failover. Clean failover generally refers to an anticipated transition from a primary to a secondary storage stamp. In embodiments, clean failover involves updating entries within a domain name server (DNS) table to reflect that the secondary storage stamp is now designated as the new primary storage stamp for that subset of data and redirecting live traffic from the primary storage stamp to the secondary storage stamp for the said data until propagation of the update to the DNS-table entries is complete. Accordingly, employing the DNS table for implementing the clean failover promotes seamless data-access to the storage account, as the uniform resource identifiers (URIs) within the DNS table are held constant. That is, a particular URI that points to the primary storage stamp for a given storage account will be recycled to point to the new primary storage stamp (former secondary storage stamp) upon propagating the updates to the DNS table.

In other embodiments, the DNS entry is not changed, because only a subset of the account's data has its primary location changed (e.g., lose just a subset of the accounts data on the primary stamp), and that subset of data is redirected from the current location to which the DNS is pointing. In these embodiments, the DNS is not changed as part of the failover process because the DNS should continue to point to the original location for the majority of the data, and then the original location (e.g., primary storage stamp) performs the redirection for just the subset of the data. Instead, a router (hardware or software) is used to redirect the traffic to the new primary location as part of the failover. In this embodiment, requests are directed to a plurality of locations based on their availability (e.g., using anycast or a global traffic manager) and then forwarded to the new primary storage stamp from those locations. That is, if there is a failover, the traffic management system is updated to redirect to the new primary storage stamp.

Abrupt failover generally refers to an unanticipated disaster at a geo-location of a primary storage stamp that triggers a transition of storage accounts, or subset of storage account data, from the primary to a secondary storage stamp(s). In embodiments, abrupt failover involves interrupting the flow of live traffic to the affected storage accounts, typically implemented from the storage-account level. Further, abrupt failover may involve replaying transactions of the GML—in a sequential manner—starting at the last committed replay point. Accordingly, these procedures that are carried out during a abrupt failover maintain high availability of storage-account data for the client and minimize or prevent loss of storage-account data.

In a specific instance, regarding a set of transactions that have been placed into the GML but have not had the commitID sent to replay them, a flush-replay operation is invoked in order to replay as many transactions as possible in light of the failover. The flush-replay operation is carried out even though the commitID has not advanced, thus, replaying transactions up until a point where the customer's data is maintained consistent. Some customers may require replaying every transaction sitting in the GML when a flush-replay operation occurs in order to achieve a high level of consistency for their application. In contrast, some customers configure the flush-replay operation to replay and commit all transactions up to the commitID, and continue replaying transactions past the commitID up until it is determined that there may exist a missing a geo-message in the GML. Upon detecting a missing geo-message, the flush-replay operation is stopped because going further could cause inconsistent data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which form a part of the specification and are to be read in conjunction therewith which are incorporated by reference herein and wherein.

DETAILED DESCRIPTION

Figure 1:
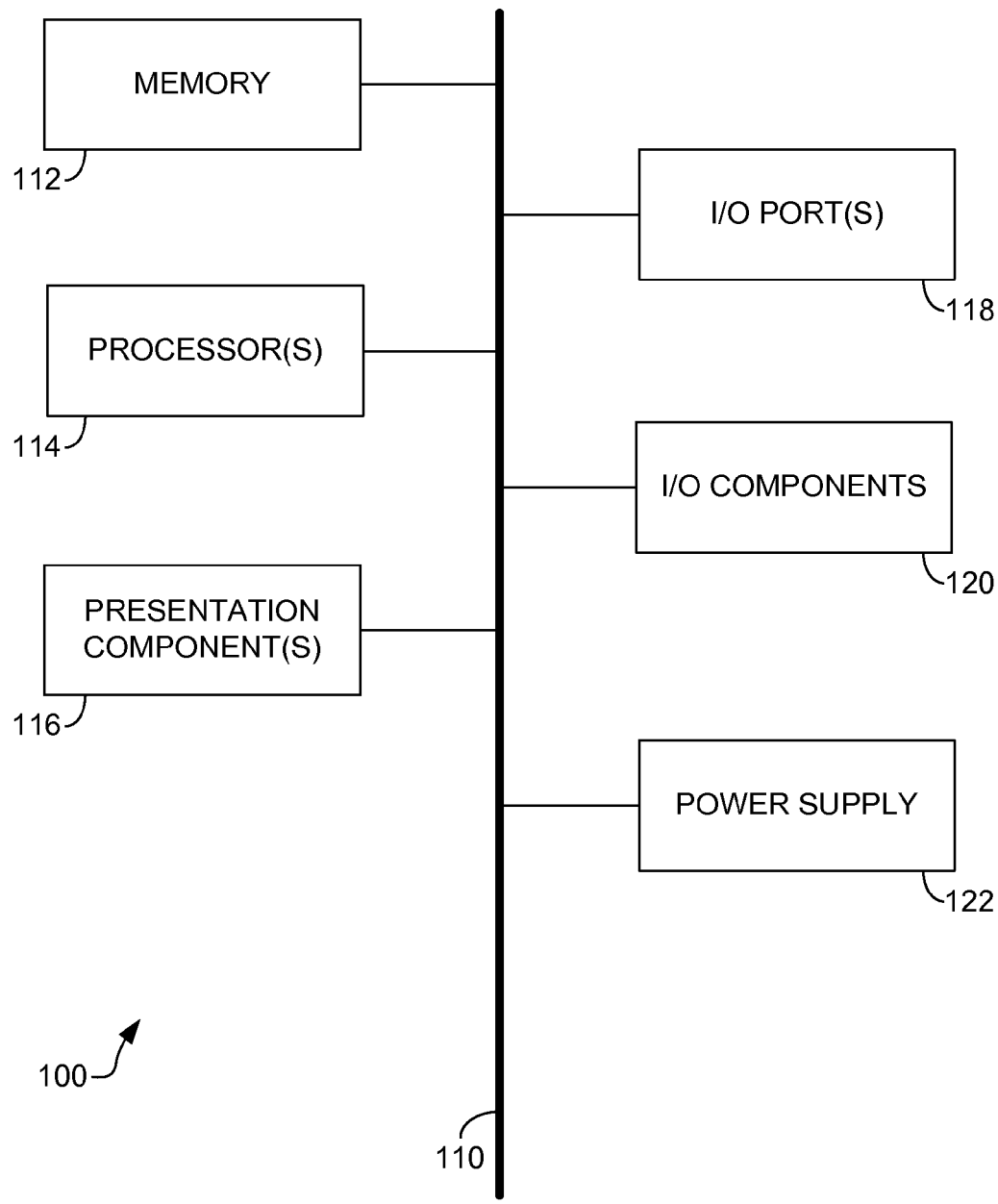
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for invoking and managing a failover between nodes (e.g., partition servers or storage stamps) at a storage-account level. In particular embodiments, the failover is generally directed toward partitions (e.g., key ranges of data within the storage account) hosted on the partition servers of a storage stamp. In operation, failover addresses the issues of corruption or loss of a primary storage stamp within a storage-stamp topology. In one instance, failover (i.e., clean failover) is triggered upon a client (e.g., customer, administrator, or custodian of the storage account, or load balancing logic of the storage system) instructing a location service to coordinate the failover for a particular storage account, thereby providing a single point-of-contact for the client when submitting the failover instructions (i.e., similar to migration). However, in other instance, a failover (i.e., abrupt failover) may be automatically triggered by the location service upon detecting that a geo-location of the primary storage stamp for a given storage account is experiencing a disaster. In this case, failover attempts to recovery as much storage-account data as possible, while decreasing the amount of downtime of the storage account used for the recovery.

Typically, proper implementation of the failover depends on performing at least one storage-account replication prior to the occurrence of the disaster. In this way, a secondary storage account, which is kept current with the primary storage stamp (e.g., maintaining a live copy of data for the storage account), is generated and ready for full-time use upon a disaster befalling the primary storage stamp. Accordingly, in order to prevent both the primary and secondary storage stamps suffering losses from a single disaster, inter-stamp replication is performed such that the primary and secondary storage stamp may exist in different geo-locations that are geographically remote from one another. However, in other embodiments the primary and secondary storage stamp may exist at a common geo-location such that a local replica of the primary storage stamp is maintained for sensitive data.

In operation, if a disaster occurs and knocks out the primary storage stamp, or a portion of the primary storage stamp, a client may almost immediately access a given storage account on a fully durable, second storage account and continue data-processing therefrom. Conventional backup-systems, in order to address a disaster, must reach to other data centers or other storage media (e.g., tapes) within the same data center with copies of a storage account to retrieve any requested data and must determine how to compensate for the data-loss of a failed node. Doing the restoration or bringing up the data to a durable level to be usable after a failover for these techniques can take significant time. In contrast, the implementation of performing ongoing replication to a secondary storage stamp while concurrently handling a client's workload at the primary storage stamp is a more time efficient way to support a failover.

In an exemplary embodiment, coordination of the failover is assigned to the location service. In this role as coordinator, the location service tracks the storage and update of data for the storage account, as well as monitoring which storage stamps are allocated as the "primary" and "secondary" for the particular storage account. This tracked information about a state of the storage account is held at a state table that is managed by the location service. Upon, receiving an automatic or manual indication to failover the storage account, the location service may update the state table and employ the state table to identify which storage stamps shall accept live traffic (e.g., secondary or destination) and which storage stamps shall redirect the live traffic (e.g., primary). In embodiments, the messages are sent from the location service to the identified storage stamps, causing account control units (ACUs) running on the identified storage stamps, respectively, to update tables of accounts persisted on each of the identified storage stamps. Typically, updating involves modifying fields within the table of accounts, such that the fields mirror the current state of the storage account maintained at the location service. Occasionally, modifying the fields of the table of accounts may involve permanently and/or temporarily changing values assigned to the fields such that steps of the failover are performed in their proper sequence.

Accordingly, in one aspect, the present invention provides a computer-implemented method in a distributed computing environment utilizing a processor and memory for invoking a clean failover of a storage account residing on storage stamps within the distributed environment. Initially, the method comprises providing a primary storage stamp and a secondary storage stamp. The primary storage stamp may include one or more source partitions configured for accepting live traffic and for sending transactions to one or more destination partitions in order to advance replication to a secondary storage stamp. The secondary storage stamp may include the destination partitions configured to replay the transactions.

In embodiments, the method may further include receiving an indication from a client or the storage system itself deciding to perform a failover between the primary and the secondary storage stamp. Upon receiving the indication to failover (e.g., clean failover), the partitions on the primary and secondary storage stamps may be reconfigured to perform flush operations in order to ensure no data-loss during the failover. Reconfiguring the source partitions may include requesting the source partitions to independently carry out a flush-send operation, where, in embodiments, the flush-send operation involves distributing pending messages to the destination partitions as a group. Reconfiguring the destination partitions may include requesting the source partitions to independently carry out a flush-replay operation, where, in embodiments, the flush-replay operation involves aggressively replaying transactions currently pending at the destination partitions. Typically, the flush-replay operation commences on the destination partitions incident to a substantial completion of the flush-send operation on the destination partitions. Upon substantially completing the flush-replay operation, the method may further involve designating the primary storage stamp as a new secondary storage stamp and designating the secondary storage stamp as a new primary storage stamp for the failed over data.

In another aspect, the present invention provides computer-storage media having computer-executable instructions embodied thereon, that when executed by a computing system having a processor and memory, cause the computing system to perform a method for implementing a abrupt failover of a client's storage account from a primary storage stamp to a destination storage stamp. Initially, the primary storage stamp associated with the storage account exists within a first geo-location, while the destination storage stamp for the storage account exist in a second geo-location that is geographically remote from the first geo-location. Upon experiencing a disaster at the first geo-location, the method involves automatically triggering a failover from the primary storage stamp to the destination storage stamp in accordance with a predefined policy. By way of example, the predefined policy may dictate that failover is automatically triggered either immediately upon detecting the disaster or upon undergoing a pre-specified period of unavailability.

In an exemplary embodiment, the failover may include the following steps: disconnecting the primary storage stamp from the client; severing an ongoing replication between the primary storage stamp and the destination storage stamp such that the communication of transactions therebetween is interrupted; and cancelling the transactions that are pending replay on the destination storage stamp. Further, failover may include replaying a history of transactions maintained by a GML on the destination storage stamp and repairing the primary storage stamp such that original data lost during the disaster is recovered. This repaired primary storage stamp may be designated as a secondary storage stamp. Eventually, replication from the destination storage stamp to the secondary storage stamp may be commenced to provide a new storage stamp that maintains a live copy of data for the storage account.

In another case, an abrupt failover may occur in which the primary storage stamp is not taken offline. For instance, the primary storage stamp may remain functional, while some of the data is lost for one reason or another. Accordingly, the abrupt failover may be carried out similarly to a clean failover (e.g., for the data that is still accessible on the primary storage stamp) except for a subset of the lost data. For the subset of the lost data, the flush-send and flush-replay are done on a best effort basis.

A third aspect of the present invention provides a computer system within a distributed networking environment for conducting a clean failover for a storage account. Generally, the system includes at least a primary storage stamp, a secondary storage stamp, and a location service. The primary storage stamp may have residing thereon one or more source partitions that represent a key range of initial data associated with a storage account. Initially, prior to failover, the source partitions are configured for accepting live traffic and for sending transactions to one or more destination partitions. In embodiments, sending the transactions promotes carrying out a replication from the primary to the secondary storage stamp. The secondary storage stamp may have residing thereon one or more destination partitions that represent a key range of replicated data associated with the storage account. In embodiments, the destination partitions are configured to replay the transactions such that the replicated data substantially mirrors content of the initial data.

The location service may be disposed to invoke changes to the configuration of the source partitions and for invoking changes to the configuration of the destination partitions upon receiving an indication to failover (i.e., migrate the access of a set of data from the primary storage stamp to the secondary storage stamp). In operation, invoking changes to implement the failover includes instructing the source partitions to refrain from accepting live traffic and to independently perform a flush-send operation, which increases a rate at which pending messages are sent to the secondary storage stamp. Implementing the failover may further include instructing the destination partitions to independently perform a flush-replay operation, which increases a rate at which pending transactions are replayed at the secondary storage stamp. Upon an individual destination partition substantially completing the flush-replay operation, the individual destination partition is allowed to commence accepting live traffic prior to others of the destination partitions. Then, upon each of the one or more destination partitions substantially completing the flush-replay operation, the primary storage stamp may be designated as a new secondary storage stamp and the secondary storage stamp may be designated as a new primary storage stamp for the failed over data.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, servers, routing devices, distributed computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," "server," "data store" etc., as all are contemplated within the scope of FIG. 1 and reference to "computer" or "computing device."

Computing device 100 typically includes a variety of computer-readable media. By way of example, and not limitation, computer-readable media may comprise the following non-transitory computer-storage media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by computing device 100. In an exemplary embodiment, the computer-readable media is a non-transitory media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like. It is understood that the computing device 100 may be manifested in a variety of forms. For example, portions of the computing device 100 may be physically located in a first geographic location while other portions may be physically located in a different geographical location. Consequently, it is contemplated that various devices, services, applications, and layers may be distributed across a variety of locations while still achieving the desired results traditionally applicable to the computing device 100.

Figure 2:
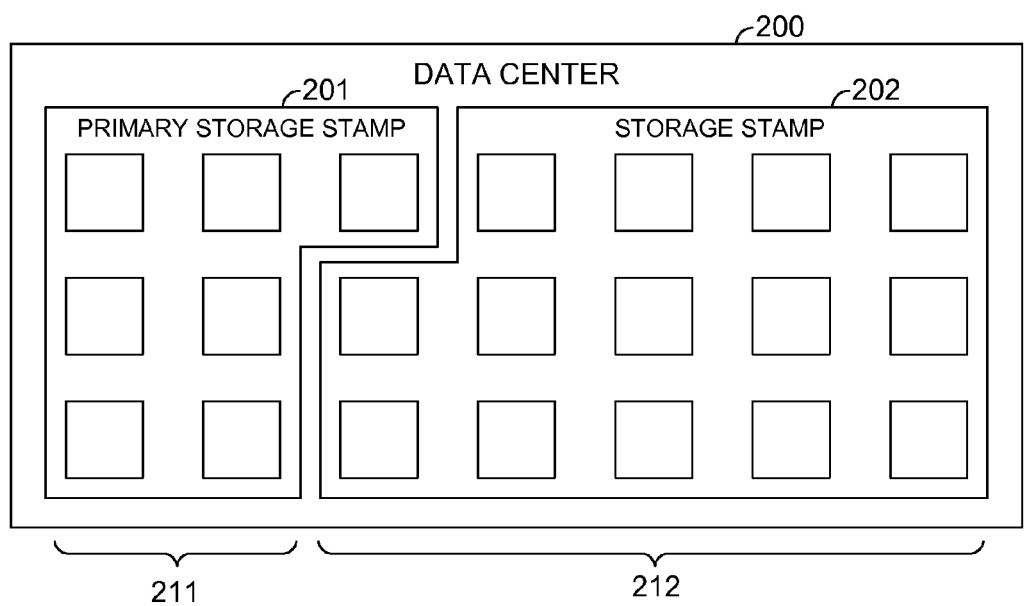
FIG. 2 depicts a block diagram illustrating storage stamps within an exemplary data store connected to a distributed computing environment, in accordance with embodiments of the present invention.

With reference to FIG. 2, a block diagram is provided illustrating an exemplary data center 200, in accordance with embodiments of the present invention. The data center 200 generally represents hardware devices configured to accommodate and support operation of software, component programs, or instances of roles, of a service application according to a service model. These roles may run on top of compute stamps (not shown). Further, the hardware devices may be configured to accommodate and support data storage and retrieval, where the data is maintained in an accessible manner to the service application. This data is stored, at least temporarily, at a primary storage stamp 201 and/or a storage stamp 202 (to be discussed hereinafter).

The data center 200 includes various resources interconnected via a network cloud. These resources, as described herein, may include software components (e.g., location service 300 of FIG. 3) as well as tangible hardware elements, such as racks housing blades, servers, and other computing devices. The network cloud interconnects these resources internally and externally with other resources, which may be distributably placed across various other data stores, and may recognize resources hosted by geographically distinct locations in order to establish communication therebetween. The network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 200 accommodates a distributed system of processing equipment, or nodes 211 and 212, that can be subject to various classes of failures. In general, the nodes represent any type of computing devices or machines, such as, for example, computing device 100 described above with reference to FIG. 1. By way of example only, and not limitation, the nodes 211 and 212 may include one or more of blades, racks, a personal computer, a desktop computer, a laptop computer, a handheld device, a mobile handset, consumer electronic device, and the like.

In embodiments, the nodes 211 and 212 may be grouped into stamps 201 and 202, respectively. In one instance, the groups of nodes 211 and 212 are formed such that not all data within the data center 200 will concurrently fall offline during a particular class of failures (specified as fault domains) or updates (specified as update domains). Accordingly, persistence of data within the data center 200 is preserved when saved across the stamps 201 and 202 or when saved to fault domains carved out of nodes within a single stamp, unless a geographic disaster occurs that destroys the entire data center 200. Typically, fault domains are abstracted from the configuration of resources of the data center 200 in order to cope with certain classes of internal failures and to make assumptions with respect to the kind of failures expected and the conditions under which such failures can occur.

In operation, a customer may specify in a service level agreement (SLA) that they desire intra-stamp replication of data associated with their storage account. This specification may be due to the need to maintain all sensitive data within a single data center 200, or single geo-location, while providing durability by maintaining a local duplicate copy. As such, intra-stamp replication is focused on making sure the customer's data is replicated durably within a single stamp, such as either stamp 201 or 202 of FIG. 2. Generally, intra-stamp replication promotes generating enough replicas/copies of the customer's data across different nodes, in different fault domains, in order to keep the data durable within the single stamp. In embodiments, intra-stamp replication employs a form of data spreading that allows the system to quickly re-replicate data to a healthy number of instances when a node is lost. It should be noted that the presence of a particular storage stamps may exist completely within a single node, may span across two or mode nodes, or even span across data centers within a given location.

Further, the customer may specify within the SLA how a storage account may be migrated. For instance, the specification may permit migration between storage stamps of a single geo-location in order keep sensitive data from being held at a remote location. Or, in another instance, the specification may permit migration between geo-locations in order to avoid data-loss as a result of a known impending geo-disaster. As such, replication and migration may be carried out as dictated by the customer's specifications in the SLA.

Although the nodes 211 and 212 are described above as being grouped according to fault and/or update domains, it should be understood and appreciated that other types of suitable criteria for grouping the nodes 211 and 212 into stamps 201 and 202, respectively, may be used, and that embodiments of the present invention are not limited to the grouping methodology described herein. Further, it will be understood and appreciated by those of ordinary skill in the art that the data center 200 shown in FIG. 2 is merely an example of one suitable portion of a distributed hosting environment and is not intended to suggest any limitation as to the scope of use or functionality of embodiments of the present invention. Neither should the data center 200 be interpreted as having any dependency or requirement related to any single resource or combination of resources illustrated therein. Further, although the various blocks of FIG. 2 (e.g., stamps 201 and 202) are shown with lines for the sake of clarity, in reality, delineating various components is not so clear, and metaphorically, the lines would more accurately be grey and fuzzy.

Figure 3:
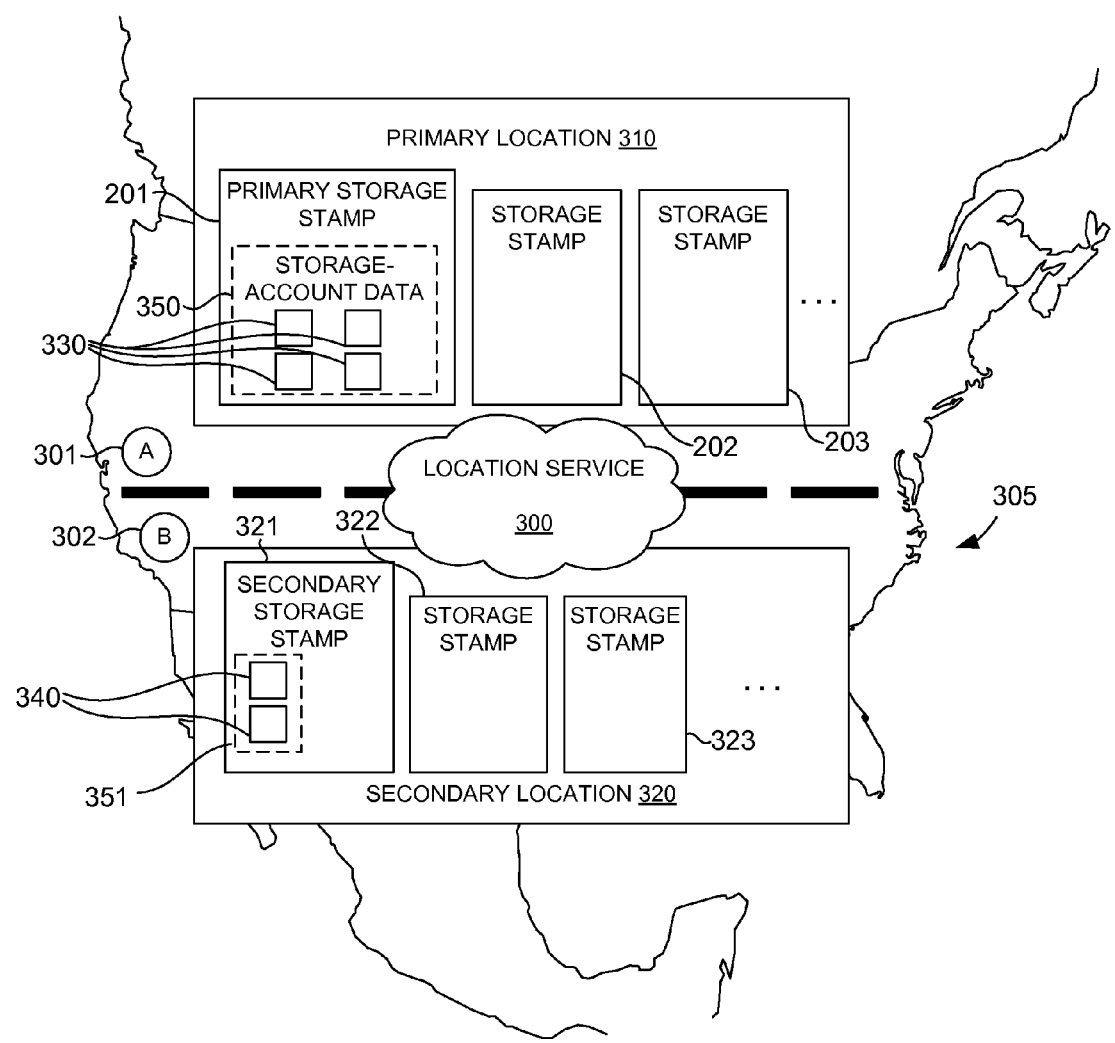
FIG. 3 depicts a block diagram of an exemplary geographic region with a primary and secondary geographic location therein, in accordance with embodiments of the present invention.

Turning now to FIG. 3, a block diagram is provided showing an illustrative geographic region ("geo region") 305. (It should be noted that like reference numerals throughout the set of figures are used to indicate similarly configured components in the various views; however, some aspects of these components sharing like reference numerals may vary according to embodiments of the present invention.) In general, the geo region 305 is a collection of geographical locations, such as primary location 301 and secondary location 302, grouped together by a political and/or governmental boundary. For example, the geo region 305 may represent the United States, while a second geo region may include Europe, and a third geo region may include Asia-Pacific regions.

As will be discussed in greater detail hereinafter, a customer of a cloud-computing service may desire to replicate data within the geo region 305, but at different geographical location(s) within the geo region. For example, the customer may desire to maintain all of their data within the United States of America (as opposed to replicating the data in a different geo region) to be subjected to the laws governing the United States of America. But, because of a business continuity plan (disaster recovery plan) or other data-contingency requirement, the client may specify the data to be replicated in different geographical locations ("locations") within the United States. As a result, the data may be accessed through the primary location 310, which may be in a first geographic location (e.g., northern U.S.A). This data may also be replicated in a secondary location 320 (e.g., southern U.S.A.), which is geographically distributed from the primary location 310.

As used herein, the phrase "geographical location" or term "location" is not meant to be limiting to any particular hardware and may encompass any amount of nodes that are capable of hosting data thereon. In one instance, the geographic location(s) include one or more data centers that each include one or more storage stamps (to be defined hereinafter). For example, the primary location 310 includes the storage stamps 201 (primary storage stamp), 202, and 203, while the secondary location includes storage stamps 321 (secondary storage stamp), 322, and 323. As illustrated, a given data center may include both a primary and secondary storage stamps. In addition, a single storage stamp may assume the role of a primary storage stamp with respect to some accounts and may assume the role of a secondary stamp to with respect to other accounts. Further, a single storage stamp may serve as a primary storage account to just a portion of a given storage account, while the same single storage account may serve as a secondary storage account to a different portion of that storage account. In this case, there exists other storage stamps that may serve as the primary or secondary storage stamps for complimentary portions of the storage account.

In addition, one attribute of the geographic locations 310 and 320 is the physical relationship between each other. Generally, the locations 310 and 320 are separated by a substantial physical distance such that the secondary physical location 320 may be insulated from a natural disaster and/or other business-interfering activity (e.g., political unrest), referred to hereinafter as "geographic disasters," affecting the primary location 310. In one example, the primary location 310 may represent a U.S.A.-based grouping of storage stamps in a city (e.g., Seattle, Wash.) residing in the northern U.S.A., while the secondary location 320 may represent a U.S.A.-based grouping of storage stamps in a city (e.g., Atlanta, Ga.) residing in the southern U.S.A.

As used herein, the phrase "storage stamp" or term "stamp" is meant to broadly refer to a collection of physical drives or other computer-readable memory, which may be coupled to one or more processors, such as compute stamps. For example, a storage stamp may be comprised of a group of nodes (see FIG. 2), a cluster of 10-20 racks of storage that maintains 2-20 petabytes of storage, or at least one data center. However, it should be appreciated and understood that a storage stamp can provide greater or less storage capacity than discussed above. Generally, storage stamps positioned with a common geographic location, such as stamps 201, 202, and 203 within the primary location 310, may be geographically close in proximity (e.g., within a common data center). As a result of the relatively close proximity to one another, a high level of connectivity exists between these physically proximate storage stamps. Further, compute stamps that run a customer's service application may be positioned within a common geographic location as the storage stamps in order to provide affinity between computation and storage via a shared switch or backbone router. However, as a disadvantage, hosting all of a customer's data on just storage stamps that are generally in close proximity to one another (e.g., stamps 201, 202, and 203 in the common primary geographic location 310) exposes the customer to complete data loss if a geographic disaster affects the geographic location in which storage stamps are situated.

Accordingly, aspects of the present invention provide for replication of data within at least one storage account between two or more storage stamps that may be geographically separate from one another, such as the primary storage stamp 201 and secondary storage stamp 321. That is, it is contemplated that data maintained in the primary storage stamp 201 in the primary location 310 is replicated to the secondary storage stamp 321 in the secondary location 320, such that the secondary location 320 and the primary location 310 are geographically separated by a sufficient distance (e.g., 100 miles, 1,000 miles, 10,000 miles, etc.). It is further contemplated that the secondary storage stamp 321 is typically within the same geo region 305 as the primary storage stamp 201, but secondary storage stamp 321 resides in a different geographic location than the primary storage stamp 201. However, under certain circumstances, embodiments of the present invention may involve establishing the primary storage stamp 201 and the secondary storage stamp 321 in separate geo-regions.

In embodiments, the customer associated with the storage-account data may select a location of the primary storage stamp 201 (e.g., primary location 310). Further, it is contemplated that the secondary storage stamp(s) (e.g., secondary storage stamp 321) are automatically selected for the customer based on a number of criteria, either provided by the customer or based on reliability, redundancy, and/or availability measures. However, it is also contemplated that either the primary location 310 and/or the secondary location 320 are selected by the customer (e.g., via the SLA) or selected for the customer.

It should be noted that this exemplary distributed system architecture of FIG. 3 is but one example of a suitable environment that may be implemented to carry out aspects of the present invention; and is not intended to suggest any limitation as to the scope of use or functionality of the invention. Neither should the illustrated exemplary system architecture be interpreted as having any dependency or requirement relating to any one or combination of the stamps 201-203 and 321-323 as illustrated. It will be understood by those of ordinary skill in the art that the stamps 201-203 and 321-323 illustrated in FIG. 3 are exemplary in nature and in number and should not be construed as limiting.

Embodiments of the present invention contemplate providing the primary location 310 and the secondary location 320 in communicative coupling via the location service 300, occasionally referred to as a Location Service (LS). This communicative coupling, typically over a networking infrastructure, allows the location service 300 to control inter-stamp replication between the stamps 310 and 321. Generally, inter-stamp replication is focused on ensuring some or all of the data from a customer's storage account 350 is replicated efficiently from the primary storage stamp 201 to its secondary storage stamp(s) (e.g., secondary storage stamp 321), if any are designated by the customer. When the storage-account data 350 is written to the primary storage stamp 201, it can be made to be durable using the process of intra-stamp replication, which replicates the data across the nodes within the stamp.

When the storage-account data 350, or accountKey, has one or more secondary storage stamps designated thereto, the process of inter-stamp replication may replicate the data through the employment of transactions, which are forwarded to the designated secondary storage stamp(s). In embodiments, the term "transactions" broadly refers to information representing a portion of the storage account data 350, or a modification thereto, that can be deterministically replayed at the secondary storage stamps to produce the same values as presently stored in the primary storage stamp 201. Upon replaying the transaction on the secondary storage stamp(s), a result of the replay is committed to the secondary storage stamp(s). This process of inter-stamp replication also involves bootstrapping (discussed in more detail below) the storage-account data 350, or part of the data 350 depending on the situation, from the primary storage account 201 to another stamp upon adding a new secondary storage account or assisting the recovery from a geographic disaster affecting storage stamp(s) on which at least a portion of the storage-account data 350 was maintained. With reference to FIG. 3, inter-stamp replication provides for maintaining the storage-account data 350 in the primary storage stamp 201 in northern U.S.A. and a replication of the storage-account data 351 in the secondary storage stamp 321 in southern U.S.A.

Further, inter-stamp replication is responsible for keeping the data healthy and current within each corresponding secondary storage stamp by sending any changes (e.g., updates, deletions, modifications, additions, and the like) from the primary storage stamp 201 to its secondaries. Thus, inter-stamp replication enhances disaster-recovery scenarios across the various stamps. For instance, in the case of a geographic disaster to the primary storage stamp 201, the location service 300 may trigger a failover to the secondary storage stamp 321 and designate the secondary storage stamp 321 as the new primary for the storage-account data 350.

In another instance, if an entire storage stamp is lost, the failover of storage accounts thereon may involve many secondary accounts, as the secondary accounts may be present across many different storage stamps. In addition, upon losing a secondary account, many different primary storage stamps that hosted the secondary account may have to rebootstrap their data to many other secondary storage stamps to generate a live copy of the data at the primary storage stamps for those accounts.

It should be noted that the inter-stamp replication generates a full replicated set of the storage-account data 350, as opposed to simple copies. Thus, upon the occurrence of a failover due to a geographic disaster affecting the primary storage stamp 201, the storage-account data 350 that is replicated to the secondaries is immediately ready to be used to serve up the contents of the storage-account data 351 to a client (e.g., service application or other tenant of the cloud-computing service that is associated with the customer) as needed. In contrast to copies of data, there is no inherent latency required to reconstruct the replicated storage-account data 351 at the new primary (secondary storage stamp 321). In this way, each stamp (e.g., primary and secondary or secondaries) maintains a level of replicated data from the customer's storage account to allow individual storage stamps to deal with failures (e.g., corrupt replica, lost disk, lost node, or lost rack) completely independently and in isolation within their own respective geographic location. In this way, the system described herein implements a logic that maintains sufficient replicas of the geo-replicated data at both the primary and secondary storage stamps to ensure that, upon the occurrence of a failover, there exists readily accessible data—allowing the primary and secondary storage stamps the ability to independently address rack, disk, node, etc., failures by re-replicating the data internally therein (i.e., intra-stamp replication), instead of relying upon external support from a remote storage stamp (i.e., inter-stamp replication). Embodiments of inter-stamp replication are discussed in more detail below with respect to FIG. 5.

Referring again to FIG. 3, the configuration and implementation of partitions will now be discussed. In an exemplary embodiment, a storage stamp may host a number of partitions associated with a particular storage account. As illustrated, the storage-account data 350 may be divided amongst the partitions 330 while the replicated storage-account data 351 may be divided amongst the partitions 340. Further, in some embodiments, the storage-account data 350 for the particular storage account is allowed to span across various storage stamps and/or across various locations.

As used herein, the term "partition," is not meant to be limiting, but generally pertains to a subset of data, or key range, of a customer's storage account. This partitioned data may be hosted on distributed nodes, partition servers, or other storage capacity allocated to a given storage stamp. Therefore, a particular and discrete amount of data hosted within a partition server of a storage stamp may be identified, at least in part, based on a partition identifier of the partition hosted on an associated partition server. In an exemplary embodiment, partitions may be utilized to manage one or more storage accounts utilizing a storage stamp. For instance, partitions associated with multiple storage accounts may be served by a single partition server within a single storage stamp. Further, it is contemplated that a customer of a single storage account may utilize two or more partitions (as will be discussed hereinafter) on various partition servers within a single storage stamp to maintain an original instance or a replicated copy of their storage-account data.

The primary storage stamp 201 is depicted as having four partitions 330 that comprise the storage-account data 350, where portions of the storage-account data 350 may be discovered by identifying which key ranges are assigned to each of the respective partitions 330. The secondary storage stamp 321 is depicted as having two partitions 340 that comprise the replicated storage-account data 351, where portions of the replicated storage-account data 351 may be discovered by identifying which key ranges are assigned to each of the respective partitions 340. As illustrated, the number of partitions 330 in the primary storage stamp 201 is different from the number of partitions 340 in the secondary storage stamp 321. This is due to the feature that storage-account data 350 may be partitioned differently than replicated storage-account data 351 based on the constraints and/or design of the respective stamps as well as the load/traffic on the stamps as well as there being a different mix of storage accounts on each stamp. Consequently, the key ranges of the data in the customer's storage account are divided differently between the partitions 330 and the partitions 340.

Although not shown in FIG. 3, the storage stamps 201 and 321 may each include partitions associated with other customer storage accounts. Further, the partition servers that host the partitions 330 and the partition servers that host the partitions 340 may also host any number of partitions associated with other customer storage accounts. For instance, a partition server allocated to the primary storage stamp 201 may host one or more of the partitions 330, which represent a discrete amount of the storage-account data 350, as well as thousands of other partitions that represent discrete amounts of data from a multitude of various other storage accounts. It is understood that any number of storage accounts and any number of partitions may be provided in the above example, and the illustration is provided for explanation purposes. Further, as stated above, a given storage stamp may act as both a primary and secondary storage stamp for different storage accounts. Also, a single storage account may be spread across multiple storage stamps. In this instance when the single storage account may be spread across multiple storage stamps, the storage account may have the portion of its data designated as primary and the portion of its data designated as secondary residing on the same storage stamp.

Figure 4:
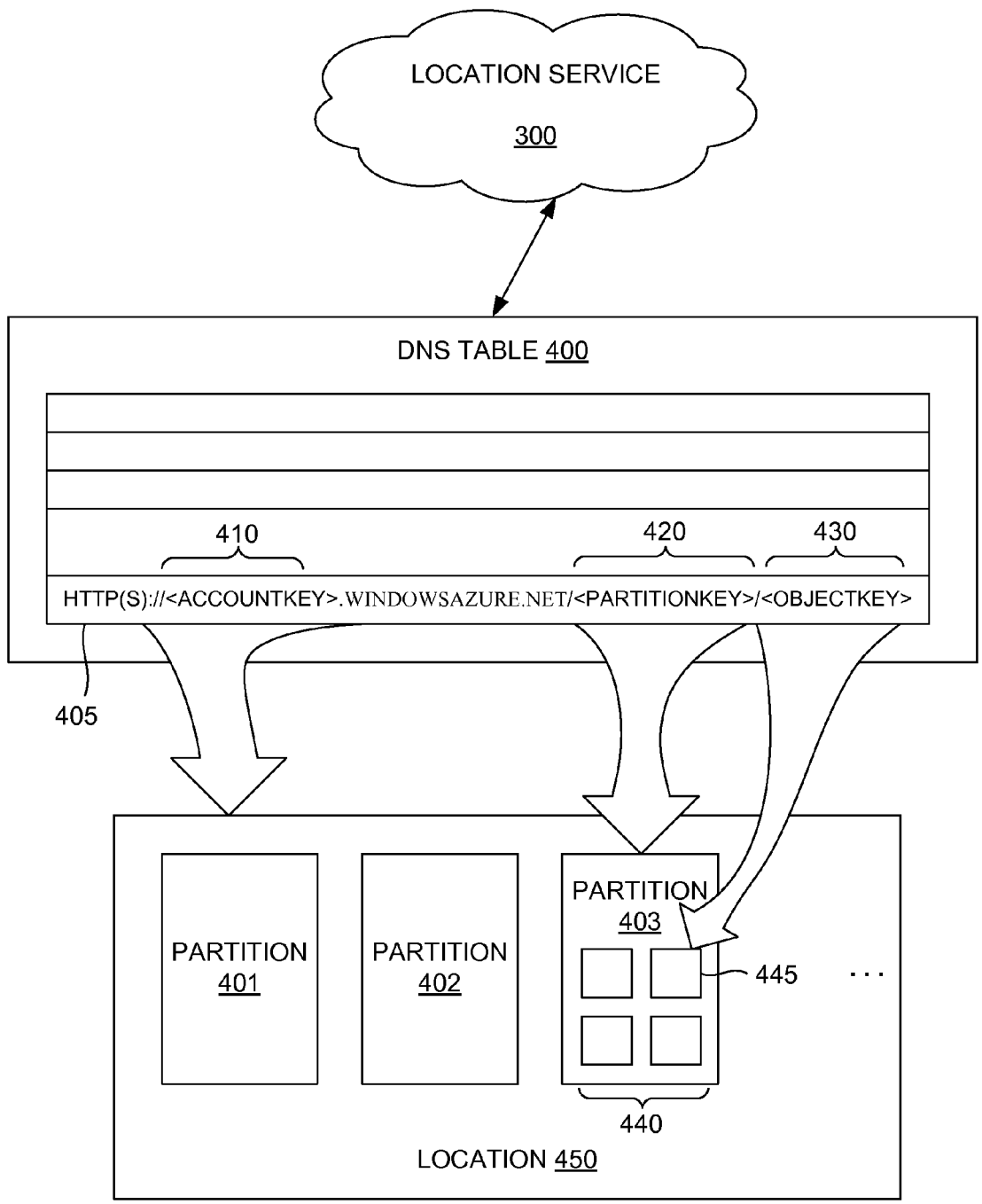
FIG. 4 depicts a schematic diagram of components comprising an entry of a domain name server (DNS) table, in accordance with embodiments of the present invention.

Turning to FIG. 4, a schematic diagram illustrating an exemplary domain name server (DNS) table 400, according to embodiments of the present invention, will now be employed to discuss a method for discovering an object within a partition within a stamp of a location. Initially, as mentioned above, each stamp is allowed to store and manage its data in partitions differently (e.g., according to constructs individual to each particular stamp). Thus, each location is enabled to load balance across the partition servers allocated to a particular stamp independently of other stamps. Further, stamps at distinct geographic locations may manage and organize partitions representing substantially similar account-storage data in distinct ways. One aspect of the present invention that allows for variation in partition-management schemes is the configuration of an internal storage namespace used to find, read from, write to, and/or modify content on partitions.

This internal storage namespace may be separate and independent between storage stamps. For example, stamps independently maintain a mapping in the form of <accountKey>/<partitionKey>/<objectKey> for each object they store to their initial and/or replicated state within the stamps, respectively. This mapping is allowed to be completely different on each storage stamp. First, the <accountKey> 410 is assigned to a specific storage account being hosted by one or more stamps. In operation, the location service 300 may rely on an entry 405 within the DNS table 400 to identify those locations (e.g., location 450) that are mapped to the specific storage account. Second, the <partitionKey> 420 is assigned to a specific partition residing within one or more of the identified locations. In operation, the location service 300 may rely on the entry 405 to identify those partitions (e.g., partition 403) of the partitions 401-403 within the identified location(s) that are mapped to a specific key range within the storage-account data. Third, the <objectKey> 430 is assigned to a specific object residing within one or more of the identified partitions. In operation, objects (e.g., object 445) of the objects 440 may be identified—within the identified partition(s) that are mapped to a specific article of data—based upon on the entry 405. This identification may be performed at the storage-stamp or partition level, while the location service 300 is mainly used to manage accounts across storage stamps without reaching down to the object level. For instance, the location service 300 may be configured to manage the location of a storage account (e.g., identity of the primary and secondary storage stamps in which the storage account is maintained) in addition to partition key ranges across storage stamps (e.g., utilized in at least storage-account migration).

As a result of the interaction between the location service 300 and the DNS table 400, the DNS table 400 is provisioned to reveal aspects (e.g., maintaining "account.windowsazure.net") pertaining to the specific address for each of the places within the distributed computing environment where a targeted object is maintained. This is true even when the address conventions in the different storage locations vary and/or when the division of storage-account key ranges varies between partitions residing at different storage locations. As such, this individuality of the stamps allows for individual load balancing on the respective stamps, as more fully discussed below with reference to FIG. 6.

In operation, the DNS table 400 function to point to a primary storage account for receiving client requests from a client. That is, entries within the DNS table 400 that are associated with a particular storage account guide the client requests for the particular storage account based on which storage stamps are designated as primary, secondary, destination for migration, and so on. Often, upon completing migration (e.g., substantially completing a bootstrapping phase of replication between a primary and destination storage stamp), the original primary storage stamp may be locally designated as "orphan," while the destination storage stamp that is targeted for migration may be locally designated as "new primary." These designations may be propagated to the DNS-table 400 entries for the particular storage account.

However, there is occasionally a lag between the propagation taking effect and localized updates to the storage stamps participating in the migration. Accordingly, the old primary storage stamp may remain active for a period of time beyond migration for that storage account (e.g., until the propagation of the new designations takes effect on the DNS table 400). Once the propagation of the new designations takes effect on the DNS table 400, the particular storage account may be deleted from the original primary storage stamp, or orphaned storage stamp. By way of example, deleting the storage account may involve scrubbing the account data from source partitions residing on the orphaned storage stamp.

In other embodiments, DNS may be employed to direct the storage account represented by account.windowszure.net to a hardware router or redirect service. As used herein, the phrase "redirect service" generally refers to a mechanism that redirects the client request to the appropriate storage stamp(s). In these embodiments, the DNS does not have to be updated to reflect or invoke migration between storage stamps, as the redirect service or the hardware router is updated instead. In operation, the redirect service would accept the incoming client request and then forward the client request to the appropriate storage stamp(s) for the storage account and/or partitionKey. In addition to the preceding, a global traffic manager (GTM), or mechanism similar to anycast, may be used to direct account.windowsazure.net to an active redirect service that directs the incoming client request to the appropriate storage stamp.

Figure 5:
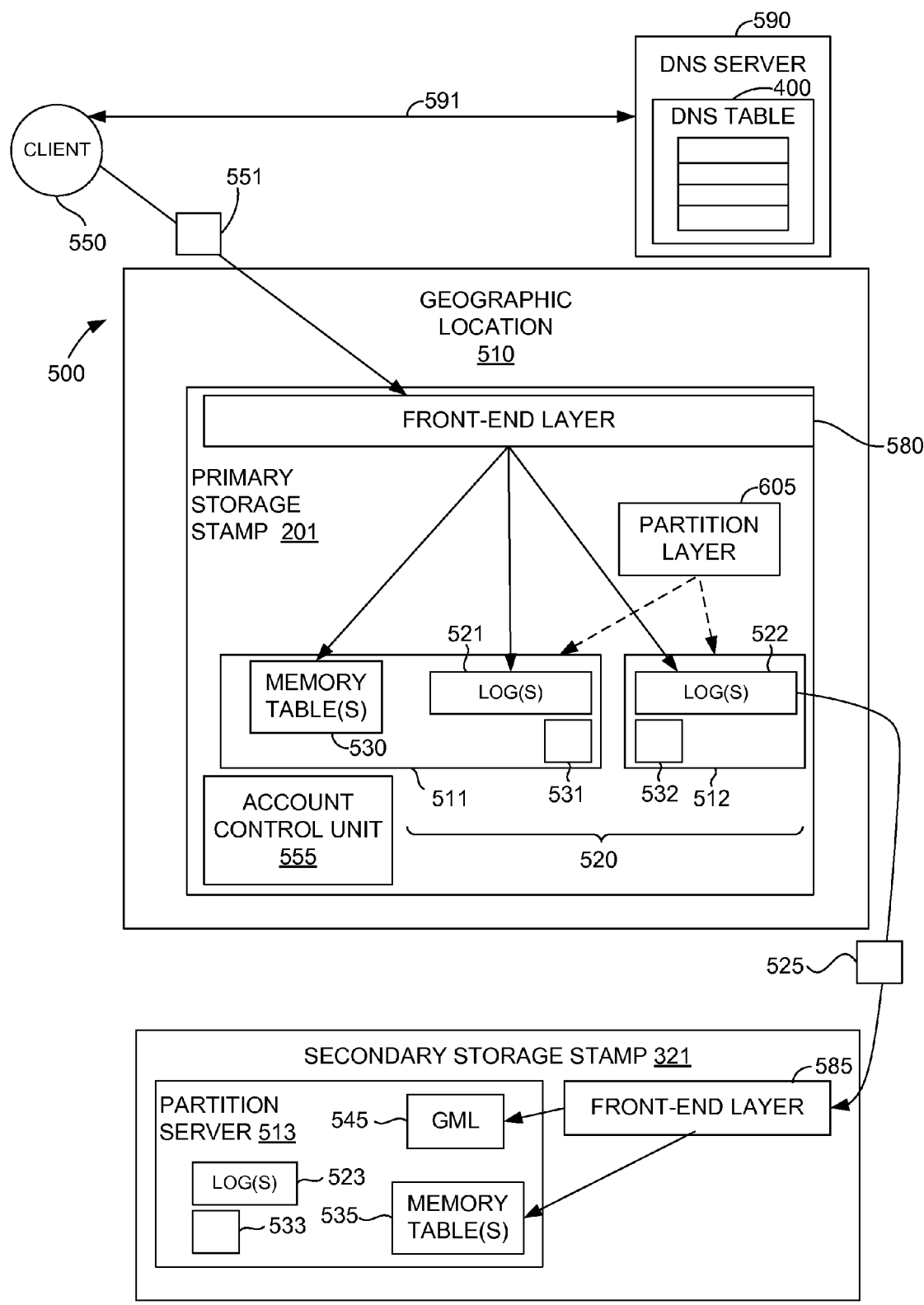
FIG. 5 depicts a block diagram of an exemplary distributed computing environment for carrying out replication between a primary and secondary storage stamp, in accordance with embodiments of the present invention.

The above techniques also allow us to span storage accounts across stamps, and they don't require updating DNS and waiting for the DNS propagation Turning to FIG. 5, an exemplary methodology for carrying out replication will now be discussed. As illustrated in FIG. 5, a block diagram of an exemplary system 500 for inter-stamp replication of data is shown, in accordance with embodiments of the present invention. Inter-stamp replication, hereinafter "replication," of data is contemplated as occurring at a number of different levels within a distributed computing environment. For example, it is contemplated that data stored on a given storage stamp may be replicated to another storage stamp. Similarly, it is contemplated that data associated with a particular storage account may be replicated. Further, it is contemplated that a portion of data represented as a particular partition may be replicated. Thus, it is contemplated as being able to be performed at any level of granularity within the system.

In an exemplary embodiment, aspects of the present invention contemplate that replication occurs at the account level such that an account will have a primary location and one or more secondary location assigned thereto, where the secondary location(s) may be geographically displaced from the primary location, as more fully discussed above. In addition, replication at the account level supports various types of failover for a specific storage account, involving migration (i.e., clean failover) from a first primary location to a second primary location or involving emergency switching of stamp designations (i.e., abrupt failover) in response to a geo-disaster in order to ensure partial storage-account recovery. Additionally, replication at the account level allows a customer to turn off replication for a particular storage account to save resources and/or money, or to prevent interception of sensitive data at a distant geographic location.

Generally, the system 500 of FIG. 5 is comprised of a geographic location 510 that includes the primary storage stamp 201, which is replicating to a secondary storage stamp 321 residing on a geographic location physically removed from the geographic location 510. The primary storage stamp 201 is comprised of a plurality of partition servers 520, such as partition servers 511 and 512. The partition servers 511 and 512, in this example, are comprised of logs 521 and 522, respectively.

In one embodiment, an exemplary partition server may be comprised of a plurality of memory tables and/or a plurality of logs. For example, the log(s) of a partition server may be comprised of an update log, a block log, a page log, sender log, and/or a geo message log. Further, the log(s) may be located within a stream layer of the distributed computing environment 500 such that the log(s) represent a discrete data stream that is configured for append only. In operation, the stream layer may be relied upon to re-establish data of a storage stamp following a local failure of the storage stamp. For example, data may be committed to a storage stamp hosted by a particular partition server. Following the failure of the partition server, the state of a partition hosted on the partition server is recreated, at least in part, by replaying one or more logs associated with that partition.

Data may not be considered committed to a particular storage stamp until it stored in one or more logs of the storage stamp, which may, in turn, cause the data to update one or more memory table(s) 530 and/or streams in the stream layer from which the data may be accessed by a requesting client (e.g., client 550). As such, the data is committed as soon as it is written to an update log, a block log, or a page log of a storage stamp for purposes of committing the result back to the client.

Data that is written the GML of a storage stamp may not be accessible to the client 550 until the data is replayed on the secondary storage stamp. Prior to or during replay, the memory table may be checkpointed to a data stream (e.g., typically after the data is committed). When checkpointing occurs, the data listed within the log can be truncated up to the last transaction held in the memory table as part of the checkpoint. In other embodiments, if log-based geo-replication is being used, the logs would be truncated after the memory table has been checkpointed and all of the data in that part of the log has also been geo-replicated.

As will be discussed hereinafter in more detail, data may be replicated via a bootstrapping phase that precedes a live-send phase. Further, data may be replicated in a sequential (sync) or non-sequential (async) manner. A customer or the location service 300 may be provisioned to select which type (sync or async) of replication shall be carried out for a specific storage account. Sync-type replication may be used when a customer desires to ensure that all transactions are consistent and successful between the primary and secondary storage stamps. In operation, once the data is written to or modified on the primary storage stamp it is then written to the secondary storage stamp before committing the data and returning success indicator back to the client. That is, success is not returned back to the client until the transaction has been applied in both places. The price of using the sync-type replication is that the changes to data have a higher latency because the changes should be committed in more than one location successfully to be returned back to the client. Async-type replication commits any changes to the primary storage stamp that have successfully executed a request thereto and have sent out a related transaction, and lazily in the background replicates the changes to the secondary storage stamp. In operation, once the data is written to or modified on the primary storage stamp it will be considered committed and a success indicator will be sent back to the client. Eventually, the data written will be replicated to the storage account's secondary storage stamp, based on available bandwidth and other considerations. As such, async-type replication performs the replication off the critical path of the primary writes, thereby instilling service applications with expected fast latencies. However, when employing async-type replication, if there is a disaster and the primary storage stamp is lost, the recent updates to the storage accounts thereto can be lost.

Returning to FIG. 5, the primary storage stamp 201 and the secondary storage stamp 321 includes front-end layers 580 and 585 (e.g., Front Ends (FE's)), respectively. Further, the primary storage stamp 201 includes an account control unit (ACU) 555 for intercommunicating states (e.g., replicate on/off, migrate on/off, receive data on/off, etc.) between the location service 300 and the partitions 531 and 532. Further yet, the primary storage stamp 201 includes partition servers 511 and 512, while the secondary storage stamp 321 includes partition server 513. As with each of the components illustrated, the number and presence of a particular component on a location or stamp should not be construed as limiting, as the components of the system 500 are selected for explanation purposes solely.

The partition servers 511-513 are equipped with log(s) 521-523, respectively. These logs may represent differing types of logs that serve differing functions. For instance, the log(s) 522 on the partition server 512 may represent sender logs that, in cooperation with a sender engine, convert and deliver transactions 525 to the front-end layer 585 of the secondary storage stamp 321. In addition, the partition servers 511-513 support maintenance of partitions 531-533 of the data of a customer's storage account.

The partition server 513, in this example, is comprised of a geo message log (GML) 545, while memory table(s) 530 and 535, which are just caches of the data committed to the logs 521, 522, 523, are shown as being associated with the primary and secondary storage stamps 201 and 321, respectively. In other embodiments, the memory table(s) may be associated with specific partition servers. Accordingly, with respect to the partition server 513, it is contemplated that one or more memory tables and/or one or more logs may be utilized in a given partition.

The operation of the front-end layers 580 and 585 will now be discussed. Among other duties that the front-end layers 580 and 585 are configured to handle, the front-end layers 580 and 585 act to process an incoming message (holding one or more transactions 525), a message passed from one storage stamp to another storage stamp for replication purposes, to ensure the received data is intended to be committed to an associated storage stamp. The front-end layers 580 and 585 may also inspect the transactions 525 and present a message to identify a particular partition within the storage stamp to which the data is to be committed. The front-end layers 580 and 585 may also be responsible for forwarding messages to appropriate partition servers that, in turn, affect the log(s) thereon. Further, the front-end layer 585 of the secondary storage stamp 321 may be responsible for accepting replication messages from the partition servers 520, reviewing the partition key ranges of the transactions carried within the messages, and transmitting the transactions to the relevant partition servers (e.g., partition server 513) within the secondary storage stamp 321 that are responsible for each respective partition key range. In this way, the front-end layer 585 acts as a dispatch mechanism that does not deal with logs or memory tables, and does not carry out committing the data. Instead, the partition server 585 is charged with managing the procedures of writing transactions to the logs for the purpose of committing the data to a relevant partition.

Generally the GML 545 operates as a message log, where the messages may provide acknowledgments of storing/committal of data, and/or provide an acknowledgment to one or more senders of the data as to the status of the data. In an exemplary embodiment, a message is written, almost immediately, upon receipt at the secondary data stamp 321 to the GML 545. This near immediate writing of the message may allow for the secondary storage stamp 321 to provide an acknowledgement back to a supplying primary storage stamp 201 that the data has been written (but may not have yet been committed) at the secondary storage stamp 321, in accordance with async-type replication. In this example of asynchronous replication, the primary storage stamp 201 can commit the transaction by writing to the GML 545 and return success to the customer, where the primary storage stamp 201 does not wait to send a message or perform the re-execution of some of the transactions 525 (e.g. carried in the message) on the secondary storage stamp 321. Consequently, the message is written to the GML 545, and then replayed (e.g., via a replay engine running on the partition server 513) at a later time.

This process of utilizing the GML 545 may decouple the primary storage stamp 201 from the secondary storage stamp 321 because the primary storage stamp 201 will not have its sending of messages blocked if there is a delay in replaying of the transactions 525 on the secondary storage stamp 321. When the primary storage stamp 201 is blocked, then a backup at the sender engine may arise that generates latency in committing updates to storage-account data. However, in the case of async-type replication, when the secondary storage stamp 321 is keeping up with the primary storage stamp 201, the messages may be replayed directly from memory without having to use or, at least, read back from the GML 545. It is contemplated that the GML 545 may be bypassed completely in one exemplary embodiment. That is, instead of routing the messages to the GML 545, incoming messages from the primary storage stamp 201 may be written directly to one or more log(s) 523 of the partition server 513 that directly support committing of data to the partition 533 (or a checkpointing process).

An exemplary flow of data to be replicated is illustrated with reference to FIG. 5. For example, a request 551 to update data is received from the client 550 at the primary storage stamp 201. The request 551 may be addressed with a name of a customer's storage account and may be directed to a specific object via DNS server 590 translation of http(s)://account-Key.windowsazure.net/. Generally, when an account is created, the location service updates the DNS table 400 accessible on a DNS sever 590 so that future client 550 requests for the storage-account name can be translated into an address of a specific storage location. Accordingly, the DNS server 590 maintains data pertaining to the location of storage accounts and is updated by a location service (e.g., location service 300 of FIG. 4). In embodiments, the location service is also responsible for assigning and managing storage accounts across the storage stamps 201 and 321.

As shown, the DNS server 590 performs a translation 591 with regard to request 551 in order to provide the proper address(es) that match the storage accounts being affected. The results of the translation 591 are returned back to the client 550 and used for properly addressing the request 551. Then the client 550 caches these translation results and sends the request 551 to the front-end layer 580 on the appropriate stamp 201 based on the addressing determined for the request 551. The front-end layer 580, upon receipt of the request 551 from the client 550, performs a translation to determine which partition servers 520 are indicated by the address to receive the request 551.

In this example, the client 550 may be a service application or any other tenant of the cloud-computing service. Depending on what configuration settings are associated with a storage account, in this example, the data in the request 551 may be duplicated in a durable manner via asynchronous- or synchronous-type replication. However, for purposes of a general discussion, an asynchronous-type replication methodology is described hereinafter with reference to FIG. 5. It is understood that the flow of data may be altered for other types or configurations of replication.

The account control unit 555 may be configured to identify what storage accounts and what information within each storage account is intended to be replicated and how it is intended to be replicated. For example, the account control unit 555 may set the inter-stamp replication policies at the partition servers 520 of the primary storage stamp 201 for a storage account that desires replication. In particular, the account control unit 555 may be responsible for communicating account names and/or partition key ranges to the partition servers 520 along with corresponding information that establishes whether replication is enabled or not, and, when replication is enabled, the appropriate secondary stamp(s) to participate in the replication. As such, the partition servers 520 are provisioned to inspect the data within the request 551 and, in conjunction with the information provided from the account control unit 555, decides whether the data is earmarked for replication and where the replication is to occur.

As will be discussed hereinafter, the data may be annotated with one or more records to facilitate replay of the data at the secondary storage stamp 321. The annotated data, in this example, is communicated from the primary storage stamp 210 to the secondary storage stamp 321 by way of the network, as discussed above. The front-end layer 585 of the secondary storage stamp 321 receives the data, which may be in the form of a message carrying transactions 525. The front-end layer 585 may then identify one of the transactions 525 (e.g., portion within the data) that should be written to the GML 545 of the partition server 513. For example, a storage-account data associated with the transactions 525 may be committed to the partition 533 of the storage account residing on the partition server 513.

The portion of data communicated from the front-end layer 585 to the partition server 513 may then be written (e.g., persisted) to the GML 545 for later committal to the partition, where the partition server 513 serves up access to the partitions it has been previously assigned. In this exemplary asynchronous-type replication model, data eventually replayed from the GML 545, via the replay engine, may be committed to the partition served by partition server 513 and corresponds to data previously committed to one or more partitions served by partition servers 520 on the primary storage stamp 201.

Returning to the GML 545, in embodiments, an acknowledgement (ack) may be communicated from the partition server 513, to the front-end layer 585, thereby indicating that the data has been written to the GML 545. As a result, the front-end layer 585, or on behalf of the front-end layer 585 by a service or control unit, communicates an acknowledgment of the persistence of the data to the primary storage stamp 201. In embodiments of the synchronous-type replication, a commitID may be updated, generated, and/or communicated from the primary storage stamp 201 to the secondary storage stamp 321 as a result of receiving the acknowledgment. With respect to asynchronous-type replication, a success indicator of the replay of the data may be communicated to the client 550 soon after the request 551 was received by the partition servers 520 on the primary storage stamp 201. After this, the transaction is geo-replicated, and stored in the GML on the secondary storage stamp 321, and an acknowledgement (ack) is sent back to the primary storage stamp 201. After one or more transactions have been successfully geo-replicated from the primary storage stamp 201 to the secondary storage stamp 321, a commitID is sent from the primary storage stamp 201 to the secondary storage stamp 321 telling the secondary storage stamp 321 to replay all of the transactions from partition servers 520 up to that point.

As mentioned above, the partitions may receive incoming data during geo-replication, which is in turn written into its GML. However, the data that is written the GML of a storage stamp may not be accessible to the client until the data is replayed on the secondary storage stamp. This data may be read from the secondary storage stamps as eventually consistent read-only copies of the data. In operation, a client would only be allowed to read the data replayed from the GML on the secondary storage stamp for a particular storage account if the client is reading the eventually consistent data, or if there occurred a failover that designated the secondary storage stamp the new primary storage stamp for the account.

The data communicated from the primary storage stamp 201 to the secondary storage stamp 321 is typically in the form of a batched message. A batched message includes a number of transactions 525 that may be destined for different partitions of a single storage account or of multiple storage accounts. The front-end layer 585 may identify the various transactions 525 within a batched message and forward the appropriate transactions to the appropriate partitions (e.g., 533), in this example. Continuing with this example, once the front-end layer 585 receives success from all of the partitions to which it sent transactions 525 from the message, the front-end layer 585 may send the acknowledgment to the primary storage stamp 201, or a particular primary (e.g., primary location 310 of FIG. 3) that was a source of the message. At this point in the example, the data at the secondary storage stamp 321 may not have been replayed from the GML 545 into one or more other log(s) 523, which may occur later asynchronously. The primary storage stamp 201, or a source partition server 512 of the primary storage stamp 201, may maintain the acknowledgements have been received back for accumulating a set of sequence numbers. Based on those acknowledgments received, the primary storage stamp 201, or the geographic location 510 that includes the primary storage stamp 201, determines if the commitID can be advanced for inclusion with future geo messages.

It should be understood that the arrangement illustrated in FIG. 5 and other arrangements described herein are set forth only as examples. Other arrangements and elements (e.g., machines, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 5 may be any type of computing device, such as computing device 100 described with reference to FIG. 1, for example. It should be understood that any number of data stores, partition servers, front ends, logs, networks, and/or memory tables may be employed within the system 500 within the scope of the present invention. Additionally other components not shown may also be included within the system 500. Accordingly, any number of components may be employed to achieve the desired functionality within the scope of embodiments of the present invention. Although the various components of FIG. 5 are shown with lines for the sake of clarity, in reality, delineating various components is not so clear. Further, although some components of FIG. 5 are depicted as single blocks, the depictions are exemplary in nature and in number and are not to be construed as limiting.

In an exemplary embodiment, the process of replication may be divided into phases. By way of example, the phases may comprise a bootstrap phase preceding a live-send phase. This distinction in phases is helpful when triggering migration operations with respect to the storage stamps participating in the migration. For instance, a determination of whether or not a storage account has exited the bootstrap phase on a particular storage stamp may invoke a change in the designations of the storage stamps hosting the storage account. Generally, the bootstrap phase refers to "bootstrapping" a storage account within a primary storage stamp to the same storage account on a secondary (destination, secondary, or backup) storage stamp in order to make an initial transfer of data, thereby catching up the storage account held on the secondary storage stamp to a current state of the storage account on the primary storage stamp. Once the secondary storage stamp is caught up to the current state of the storage account, the primary and secondary storage stamp may enter the inter-stamp replication phase that maintains the storage-account data of the secondary storage stamp current with the primary stamp, as described more fully above with reference to FIG. 5.

Provisioning a new storage account involves employing the location service to selecting at least two candidate stamps. One designated as the primary and other to be designated as the secondary storage stamp according to one or more of the following criteria: available storage capacity, bandwidth, transactions, type and configuration of resources, and geographic location. Once the candidate stamp is selected and designated as the primary or secondary storage stamp, the designation is stored at an ACU (e.g., account control unit 555 of FIG. 5), which may assist the location service in orchestrating the provisioning of the storage account by providing an account key, permission key, and other account information to help validate the storage account on the secondary storage stamp is authorized to receive data.

Next, the location service may direct the ACU on the primary storage stamp to execute and control the data-transfer portion of bootstrapping, which involves sending data between stamps from a beginning to an end of a key range for the storage account, thereby copying substantially all the data from the primary storage account over to the secondary storage account. In one embodiment, this data is sent in the form of transactions (e.g., transactions 525 of FIG. 5) that are replayed on appropriate partition servers of the secondary storage stamp in order to commit the data. Sending data from the primary storage account typically involves the sender engine managing an organized distribution of transactions (e.g., according to sequence number and epoch number) from the logs (e.g., log(s) 521 and 522 of FIG. 5) associated with the partitions residing within the primary storage account. Replaying the transactions typically involves those steps described above when replaying a transaction during storage account replication. As such, bootstrapping involves partition servers undertaking a large amount of workload at both the primary and secondary storage stamps within a short period of time.

In another instance, bootstrapping involves rapidly catching up an existing secondary storage account to the current state of the primary storage account (i.e., resolving an occasion in which partial data is lost on the secondary stamp due to a disaster). In this instance, a complete data-transfer is not necessary. Instead, a checkpoint-based system may be applied to resend just those portions of data that not were lost on the secondary stamp for the storage account. In embodiments, the checkpoint-based system may insert "checkpoints" within log(s), or update logs, on partitions of both the primary and secondary storage stamps to signify successful replication. In this way, persistent data is marked as being stored when the memory tables have checkpoints inserted therein—causing the listing of transactions within the update logs to be truncated.

Upon detecting lost data on the secondary storage stamp, substantially all recent data (i.e., back to the latest verifiable checkpoint) within the checkpointed data stream and update log is contemporaneously pushed to the partition servers of the secondary storage stamp in order to replace the lost data or any other corrupt data stored on the secondary storage stamp. Consequently, the designated checkpoints from the data stream and the update logs on the primary-storage-stamp side are flushed, while this newly generated backlog of data pushed to the log(s) of the partition servers on the secondary-storage-stamp side are replayed to commit the data to the partitions thereon. Accordingly, this type of update bootstrapping also incurs an extensive amount of time-sensitive workload at both the storage stamps involved.

It should be appreciated and understood that the process of pushing recent data within the update log my occur on the primary storage stamp upon detecting lost data on the secondary storage stamp. For instance, if it is determined that a subset of the data on the primary storage stamp is lost, the traffic for that data may be paused on the primary storage stamp and pushed such that the lost data from the secondary storage stamp is sent back to the primary storage stamp, thus, allowing client access to continue for that subset of data.

Figure 6:
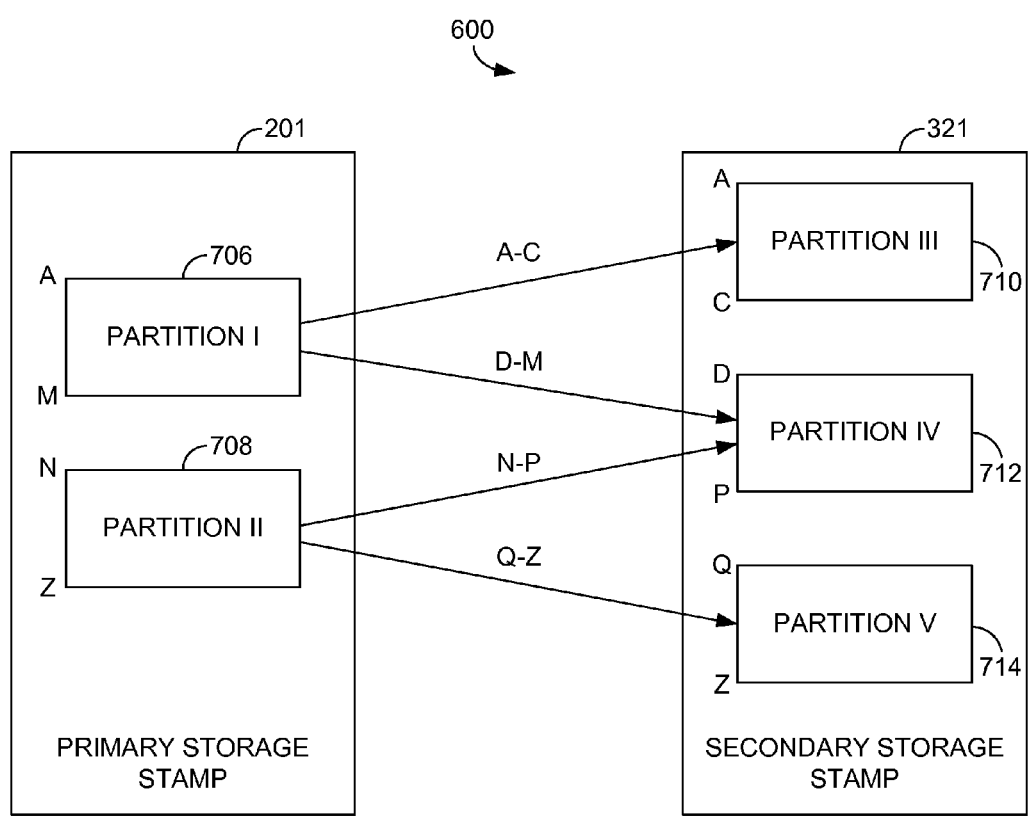
FIG. 6 depicts a block diagram illustrating an exemplary division of key ranges across partitions in separate storage stamps, in accordance with aspects of the present invention.

Turning now to FIG. 6, a block diagram is shown illustrating an exemplary division of key ranges across partitions I-V in separate storage stamps 201 and 321, respectively, in accordance with aspects of the present invention. Generally, the block diagram of FIG. 6, which is depicting a distributed computing system 600 having the primary storage stamp 201 and the secondary storage stamp 321 for a storage account interconnected, as described above, is provided for purposes of explaining how a destination partition (e.g., partition IV 712) may receive transactions from a plurality of source partitions (e.g., partitions I 706 and II 708).

It should be appreciated and understood that the primary and secondary storage stamps 201 and 321 are not designated as such with regard to the distributed computing system 600. Instead, the primary and secondary storage stamps 201 and 321 are designated as such with respect to each particular storage account. For example, a given storage stamp can be chosen as a primary storage stamp for one storage account, while the same storage stamp may be chosen as a secondary storage stamp for another storage account. Thus, a storage stamp may be assigned as a "primary" for some storage accounts and as a "secondary" for other storage accounts, thereby assuming different roles for different storage accounts hosted thereon.

In embodiments, a partition of the secondary storage stamp 321 may receive data from a single partition or from a plurality of partitions on the primary storage stamp 201. Accordingly, this disproportionate configuration of various source partitions targeting a single destination partition may trigger a load-balancing action by a service on the partition layer (e.g., partition layer 605) of the secondary storage stamp 321. This redistribution of the partitions on the primary and/or secondary storage stamp(s) helps prevent the partitions from experiencing a processing overload upon fielding transactions from various other partitions concurrently.

Initially, the primary storage stamp 201 is comprised of two partitions related to a particular storage account, which are the partitions I 706 and II 708. As illustrated, the partition I 706 includes data spanning key range of A through M. Meanwhile, the partition II 708 includes data spanning the key range of N through Z. Dissimilarly, the secondary storage stamp 321 is comprised of three partitions related to the particular storage account and that are intended to maintain the replicated data of key range A through Z. Therefore, an unparallel relationship between the storage stamps 201 and 321 exists, in this example, where the secondary storage stamp 321 is comprised of partitions III 710, IV 721, and V 713.

In operation, the partition III 710 is initially designated to receive and maintain data from the key range of A through C, the partition IV 712 is designated to receive and maintain data in the key range of D through P, and the partition V 714 is designated to receive and maintain data in the key range of Q through Z. In order to accomplish the task of committing data from a plurality of source partitions I 706 and II 708, one or more range buckets may be maintained at a partition layer of the secondary storage stamp 321. These range buckets function to track different commitIDs from the different source partitions I 706 and II 708. The range buckets may then be utilized by the secondary storage stamp 321 when replaying data from a log (e.g., GML) on the secondary storage stamp 321, or partition servers therein (not shown), to sequentially commit the data to the destination partitions III 710, IV, 712, and V 714.

The utilization of range bucketing may be used in one embodiment to modify (e.g., typically increase, but sometimes decrease) the number of partitions utilized by the particular storage account. For example, the storage account may be utilizing two partitions on a hypothetical primary storage stamp, while the data could be using three partitions on the secondary storage stamp. If another secondary storage stamp is assigned to the storage account, this other secondary storage stamp would likely have different partitioning with respect the initial secondary storage stamp.

As illustrated in FIG. 6, the secondary storage stamp 321 is configured for receiving transactions from the primary storage stamp's 201 partitions 706 and 708, and for committing the storage account's data into three partitions 710, 712, and 714 during replication. Further yet, the concept of range bucketing may be implemented in situations where a GML at a secondary storage stamp 321 is unable to keep up with source partition(s) 706 and 708 conveying transactions thereto. In this situation, if the partition 712 cannot keep up due to the fact it is getting transactions from both partitions 706 and 708, load balancing may be triggered on the secondary storage stamp 321 to further split partition 712 into two more partitions (not shown). That is, if the GML fails to keep pace with transactions distributed from the partitions 706 and 708, additional parallelism between the partitions on the secondary storage stamp 321 and the partitions 706 and 708 on the primary storage stamp 201 may be generated. In this example, the mechanism of range bucketing may be employed to facilitate later replay at each partition server where there exists a presence of a destination partition of the storage account. Further, in this example, each of the destination partitions that are created may have their own GML, which reduces the burden inherent in operating from just a single GML.

Applying the example above to the distributed computing environment 600 of FIG. 6, the comparatively large key range of D-P may prompt a split operation on the partition IV 712 of the secondary storage stamp 321, as the partition IV 712 may start lagging in replay of transactions when the associated storage account becomes active. Upon issuing the split operation, the partition IV 712 may be split among two or more partition servers on the secondary storage stamp 321. As such, the processing computing capacity allocated to the key range of D-P is multiplied. In one instance, upon performing the split operation, the child partitions of the partition IV 712 each address (e.g., replay) transactions within the key range of D-P in the GML, thereby sharing the total load. In another instance, the child partitions may be assigned a separate portion (e.g., D-M or N-P) of the key range of D-P to ensure there is no overlap during replication.

Figure 7:
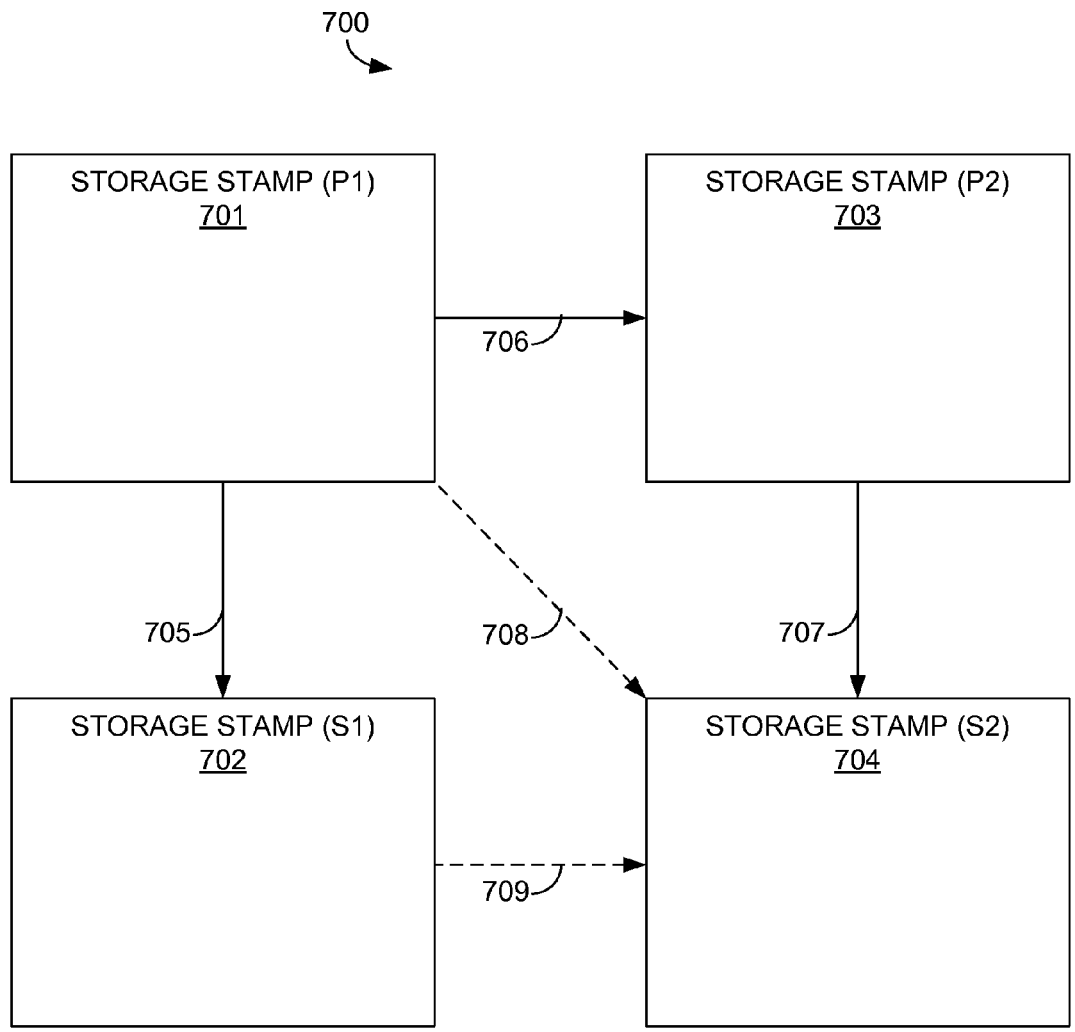
FIG. 7 depicts a block diagram illustrating a high-level architecture of an exemplary migration, in accordance with embodiments of the present invention.

Turning now to FIG. 7, a block diagram is depicted that shows a high-level architecture 700 of an exemplary migration, in accordance with embodiments of the present invention. Initially, the architecture includes four storage stamps 701-704 that are interrelated via a storage account, where the interrelationships are maintained both locally (e.g., using ACUs running on the respective storage stamps) and remotely (e.g., using the DNS table and/or a state table managed by the location service). It should be appreciated and understood that the number and organization of the storage stamps 701-704 is arbitrary and illustrated for purpose of describing embodiments of the present invention. Other embodiments of the present invention contemplate different numbers and organizations of storage stamps.

As illustrated, the storage stamp (P1) 701 represents a storage stamp originally designated as "primary." As discussed herein, P1 701 is configured for accepting requests from a client and sending replication transactions upon processing the client requests. The storage stamp (S1) 702 represents a storage stamp originally designated as "secondary." S1 702 is configured for redirecting the client requests to the P1 701, if necessary, and for accepting replication transactions from P1 701 for eventual replay. It should be noted that independent of migration, S1 702 may be allowed to be configured as read-only in order to provide eventually consistent reads to occur, whereas all writes are redirected to P1 701.

The storage stamp (P2) 703 represents a storage stamp originally designated as "destination." Upon the storage account being provisioned therein, P2 703 is configured for accepting replication transactions from P1 701 for eventual replay, similar to S1 702. Further, P2 703 is configured for sending replication transactions to the storage stamp (S2) 704 upon processing the replication transactions from P1 701. In this case, S2 704 represents a new secondary storage stamp for the storage account after migration, where both the primary and secondary storage stamps are migrated for the storage account. Upon the storage account being established therein, S2 704 is configured for accepting replication transactions from P2 703 for eventual replay, similar to S1 702.

In other embodiments, the storage stamps designated as primary and secondary may be changed due to load balancing within the data center. Thus, there may be instances where S2 704 does not exist. For example, if migration is not ongoing to a predefined secondary storage stamp, then S2 704 is irrelevant. In this scenario, upon performing a migration switch, P2 703 may be instructed to commence replication to S1 702 as its secondary storage stamp. Similarly, in other scenarios, P2 703 may not exist and migration of the secondary storage stamp occurs from S1 702 to S2 704.

As shown in FIG. 7, the reference numeral 705 represents a replication relationship between P1 701 and S1 702. The reference numeral 706 represents a replication relationship between P1 701 and P2 703. In addition, the reference numeral 707 represents a replication relationship between P2 703 and S2 704. Although various different relationships 705-707 interconnecting the storage stamps 701-704 have been described, it should be understood and appreciated that other types of suitable relationships that provide replication in anticipation of migration may be used, and that embodiments of the present invention are not limited to those interrelationships described herein. For instance, the reference numeral 708 represents a possible replication relationship between P1 701 and S2 704, thereby relieving P2 703 from the duty of sending replication transactions to S2 704 upon processing the replication transactions from P1 701. In another instance, the reference numeral 709 represents a replication relationship between S1 702 and S2 704, which transfers the role of originator of a replication from the P2 703. The arrow 709 would also be used in the scenario where we need to migrate only the secondary, but not the primary. The arrow 710 between P2 703 and S1 702 represents only migrating the primary, but not the secondary. As will be discussed below, these relationships 705-709 may change upon invoking migration and may vary during the migration. However, one goal of embodiments of the present invention pertains to capturing these relationships 705-709 at both a location service and the respective storage stamps 710-704 while incurring minimal changes to existing persisted state data.

Figure 8:
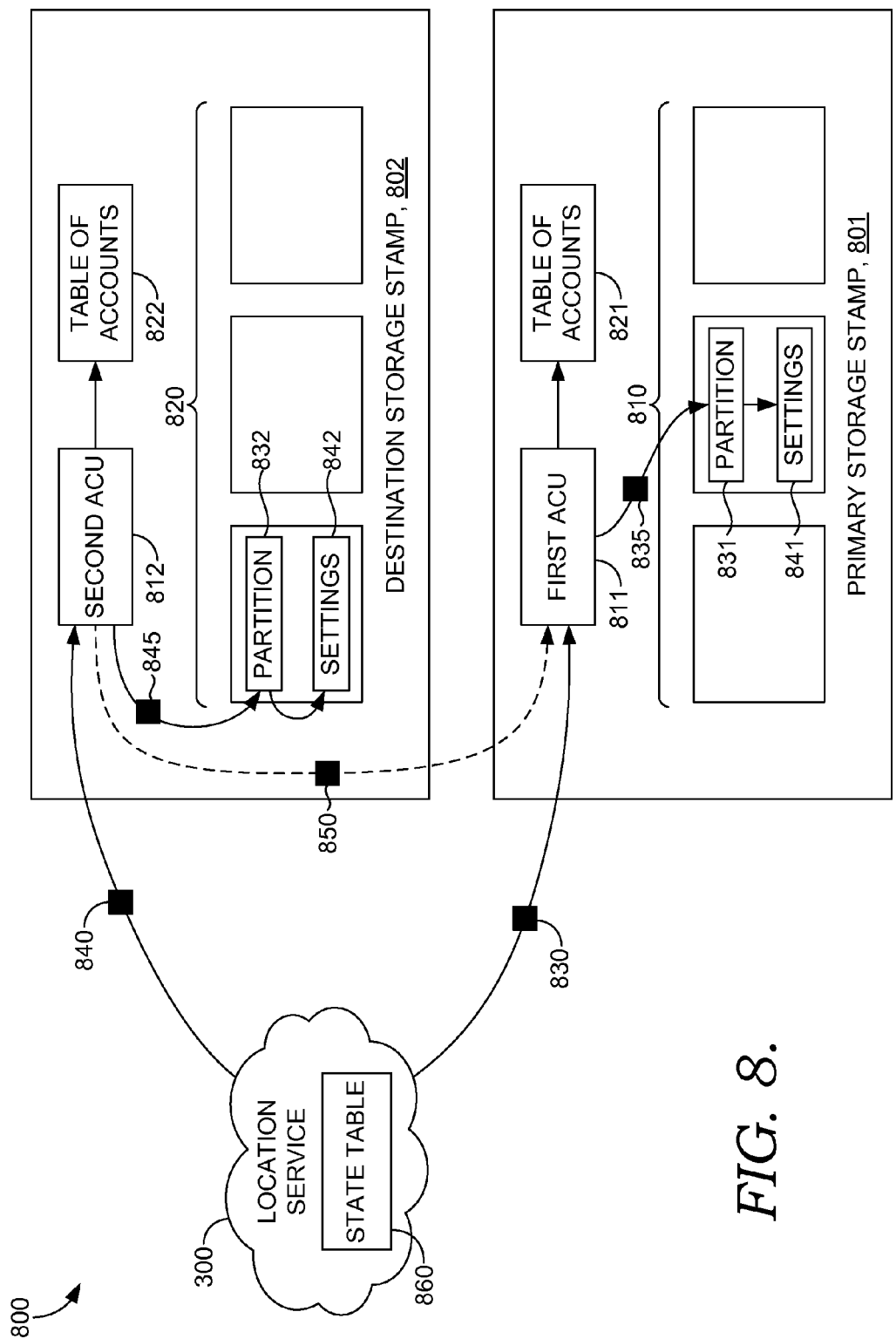
FIG. 8 depicts a block diagram of an exemplary distributed computing environment for carrying out migration between a primary and destination storage stamp, in accordance with embodiments of the present invention.

Turning now to FIG. 8, a block diagram is illustrated showing an exemplary distributed computing environment 800 for carrying out migration between a primary 801 and a destination storage stamp 802, in accordance with embodiments of the present invention. As shown, the distributed computing environment 800 includes the location service 300 that is interacting with a given storage account presently hosted on the primary storage stamp 801 and the secondary storage stamp 802, on which a presence of the storage account is recently established for the purpose of migration. Further, the primary storage stamp 801 includes the following: partition servers 801 hosting one or more source partitions 831 that represent a key range of initial data associated with the storage account; a first table of accounts 821 for use in directing live traffic targeting the primary storage stamp 801; and a first ACU 811 for initiating updates to the first table of accounts 821 and to settings 841 of the source partitions 831. Even further, the destination (secondary) storage stamp 802 includes the following: partition servers 820 hosting one or more destination partitions 832 that represent a key range of replicated data associated with the storage account; a second table of accounts 822 for directing live traffic targeting the destination storage stamp 802; and a second ACU 812 for initiating updates to the second table of accounts 822 and to settings 842 of the destination partitions 832.

As discussed above, the replicated data maintained at the destination partitions 832 substantially mirrors content of the initial data maintained at the source partitions 831. It should be noted that the number and organization components within the distributed computing environment 800 are exemplary and selected for purposes of explanation. Further, although not explicitly shown, the primary and destination storage stamps 801 and 802 may coexist within a common geo-location (e.g., P1 and P2 of FIG. 7), may be remotely positioned in separate geo-locations (e.g., P1 vs. S1 of FIG. 7), or may be portions of the same storage stamp or node within a common data center.

Further, it should be noted that replication between the primary and destination storage stamps 801 and 802 has been previously set up such that data is actively replicating from the primary storage stamp 801 to the destination storage stamp 802. For the purposes of discussion, it should be assumed that the replication is substantially caught up (e.g., replay lag on the destination storage stamp 802 is not that far behind the committing of the transactions on the primary storage stamp 801).

The process of stepping from replication to migration will now be discussed. Typically, setting up replication between storage stamps and migration are independent steps controlled by the location service. That is, in order to perform a migration, the location service implements the replication via a two-step process using the two storage stamps. Initially, the location service sends messages 830 and 840 to set up basic replication. When this occurs, the destination storage stamp 802 appears to the location service as any other normal secondary storage stamp. At this point in time, the primary and destination storage stamps 801 and 802 are not made aware of a migration. (The primary and destination storage stamps 801 and 802 are simply replicating data given the configurations the location service passed down).

Once the location service understands that the migration is to be carried out, the location service will watch the status of the primary and destination storage stamps 801 and 802 in order to measure a level of lag for the inter-stamp replication. Upon recognizing the level of lag is low for the storage account to be migrated, the location service initiates the migration. That is, after the data in the being replicated is substantially caught up in terms of replay, the location service issues additional commands to both the ACU's 811 and 812 to commence migration. At this point, then the two storage stamps 801 and 802 are informed of the impending migration and perform the correct steps. These steps involve the primary storage stamp 801 commencing redirection and flush-send operations, while the destination storage stamp 802 commencing flush-replay operations while waiting for the last commitIDs of the partitions from the primary storage stamp 801 before taking traffic for those partition key ranges.

During migration, the location service 300 interacts with the primary and secondary storage stamps 801 and 802. For example, upon receiving instructions to migrate the storage account (i.e., move the storage account by way of inter-geo-location or intra-geo-location), the location service 300 may send messages 830 and 840 to the first and second ACUs 811 and 812, respectively, to invoke local record changes within the storage stamps 801 and 802. In one embodiment of a local record change, the message 840 may trigger the second ACU 812 to designate the destination storage stamp 802 as a new secondary storage stamp by updating the second table of accounts 822 and the settings 482. In addition, it communicates to 801 and the ACU there that it has a new secondary so that it can start bootstrapping and replicating the data to that new secondary. Further, upon receiving the message 830 from the location service 300, the first ACU 811 may initiate replication by toggling settings 841 within the source partitions 831 residing on the primary storage stamp 801. By way of example, the settings 841 may allow the ACU 811 to enable or disable replication on the partitions 831 by toggling the settings 841 on and off, respectively. In embodiments, the first table of accounts 821 maintains a listing, or catalogue, of the source partitions 831 residing on the primary storage stamp 801 that are associated with the storage account. Accordingly, the first ACU 811 employs the listing within the first table of accounts 821 to identify the appropriate source partitions 831 prior to toggling the settings 841 thereof. In an exemplary embodiment, toggling the settings 841 of the identified partitions 831 involves passing parameters 835 to the identified partitions 831 from the first ACU 811. By way of example, the parameters 835 comprise at least one of a location of the destination storage stamp 802, an indicator of whether replication is turned on or off, and key ranges assigned to partitions 832 residing on the destination storage stamp 802. These steps immediately above may be performed in a similar manner by the second ACU 812 with respect to the destination partitions 832 (i.e., passing parameters 845 to the settings 842).

With continued reference to FIG. 8, as mentioned above, replication may generally involve a bootstrapping phase followed by a live-send phase. In this light, the first ACU 811 may be configured to communicate to the location service 300 a status of the bootstrapping and live-send phases upon interacting with the source partitions 831. In other embodiments, the location service 300 polls or sends a heartbeat to the ACU 811 to collect information about the ACU's 811 status.

Once the storage account is in live replication between 801 and 802, the location service monitors the progress of the replication through communication with the ACU in 801 or both of them (801 and 802). When the location service determines that the replication lag is small enough (this is the time from committing the transaction in 801 to when it is replayed in 802), it initiates a migration command to both of the ACUs in 801 and 802. The reason for waiting for the replication lag to be small is to allow the migration's clean failover to be very quick. To initial migration the location service sends two new commands 830 and 840 to the two ACUs. In one embodiment of a local record change, the message 840 may trigger the second ACU 812 to designate the destination storage stamp 802 as a new primary storage stamp by updating the second table of accounts 822 and the settings 482. In another embodiment of a local record change, the message 830 may trigger the first ACU 811 to designate the primary storage stamp 801 as an orphan storage stamp for this storage account by updating the first table of accounts 821 and the settings 481. This process for carrying out a migration by updating values in tables or settings is described in detail with respect to FIGS. 9-13.

The location service 300 may update the state table 860 and send requests to at least one of the first ACU 811, the second ACU 812, and the DNS server 590 of FIG. 5, which is operably coupled to the location service 300. Upon receiving the location-service request at the first ACU 811, the first ACU 811 may update the first table of accounts 821 to designate the primary storage stamp 801 as an orphan storage stamp with respect to the storage account. In operation, the orphan storage stamp actively redirects live traffic (e.g., client requests) to 802. Upon receiving the location-service request at the second ACU 812, the second ACU 812 may update the second table of accounts 822 to designate the destination storage stamp 802 as a new primary storage stamp with respect to the storage account. In operation, the new primary storage stamp provides the client read and write access to replicated data stored thereon. In some embodiments, the partitions 832 on 802 do not start taking live traffic until they detect a final clean failover commitID from the partitions 831 in 801 and have fully replayed the replicated transactions up through the commitID.

Figure 9:
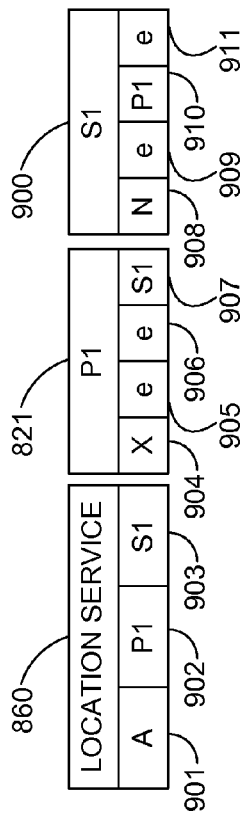
FIGS. 9-13 depict exemplary tables that govern data flow between storage stamps when carrying out a migration, in accordance with embodiments of the present invention.

Referring to FIGS. 9-13, exemplary tables are shown that govern data flow between storage stamps when carrying out a migration, in accordance with embodiments of the present invention. Initially, FIG. 9 depicts a state of replication where a primary storage stamp is replicating data to a secondary storage stamp. This state of replication is represented by a condition of the state table 860 (see FIG. 8), the first table of accounts 821 (see FIG. 8), and a table of accounts 900. Initially, the meaning assigned to the characters within the tables 860, 821, 900, and subsequent others are as follows: "A" is name of a storage account, "P1" indicates a primary storage stamp, "S1" indicates a secondary storage stamp, "P2" indicates a destination storage stamp, "S2" indicates a new secondary storage stamp (i.e., secondary storage stamp to P2), "X" indicates an execution procedure, "N" indicates a refrain from execution, "M:" indicates a migration identifier that affects the subsequently listed storage stamps, "O:" indicates an orphan identifier that affects the subsequently listed storage stamps, and "e" indicates an empty set. The meanings and organization of P1, S1, P2, and S2 are consistent with those previously established with respect to the architecture 700 of FIG. 7.

The fields 901-903 of the state table 860 each represent a particular action. In an exemplary embodiment, field 901 represents the name of the storage account that is the subject of a replication or migration, field 902 represents a primary storage stamp, and field 903 represents at least one secondary storage stamp to which the subject storage account is being replicated. The fields 904-907 of the table of accounts 821 for P1 and the fields 908-911 of the table of accounts for S1, as well as for P2 and S2, have substantially the same meaning, respectively. In an exemplary embodiment, with respect to the table of accounts 821, the field 904 indicates whether incoming requests from the client targeting the storage account are executed on P1 (the "X" indicates they are), the field 905 indicates whether the incoming client requests targeting the storage account are to be redirected to another storage stamp (the "e" indicates they are not), the field 906 identifies any storage stamps from which the storage account on P1 is accepting transactions for replication thereon (the "e" indicates P1 is not replicating the storage account from another source), and the field 907 identifies any storage stamps established to receive the transactions of replication from P1 (the "S1" indicates that S1 is replicating the storage account from P1).

Figure 10:
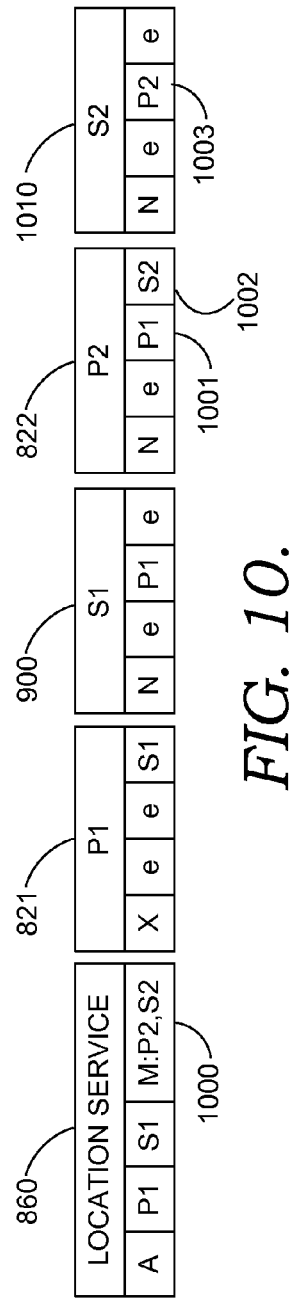

Turning now to FIG. 10, the location service may initiate replication to P2 and S2 such that P1 replicates to P2, and P2 replicates to S2. The initiation of replication is reflected by field 1000 of the state table 860 that includes the value of "M:P2, S2," which generally communicates that P2 and S2 are the target of a migration of P1 and S1, respectively. In this regard, messages from the location service may trigger the ACUs on P2 and S2 to update their respective tables of accounts 822 and 1010. Updating may include adding value "P1" to field 1001 (representing P2 is now accepting and replaying transactions from P1), adding value "S2" to field 1002 (representing P2 is now sending transactions to S2 for replay), and adding value "P2" to field 1003 (representing that S2 is now accepting and replaying transactions from P2). Thus, P2 is now set up to take replication requests from P1 and to forward transactions to S2 for replication. Further, the fields are mirrored between P2 and S2 for replication such that the data being replayed at P2 is concurrently sent to S2 using the sender engine. In another embodiment (not shown), P2 may be pointed backward to S1 via the table of accounts 822 in order to save resources in getting S2 up to speed.

Figure 11:
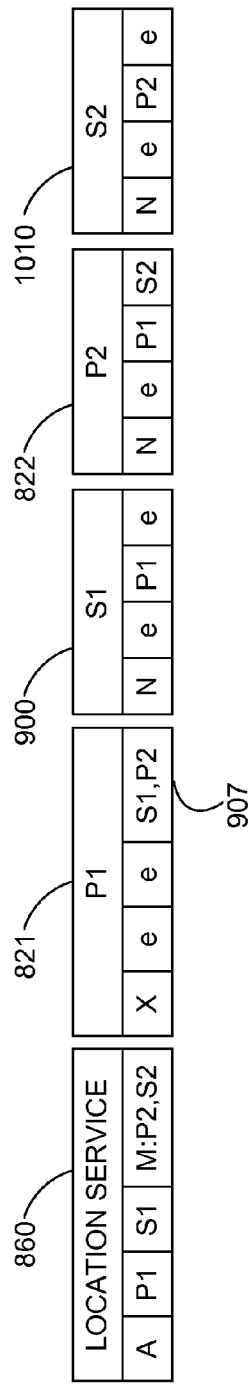
Figure 12:
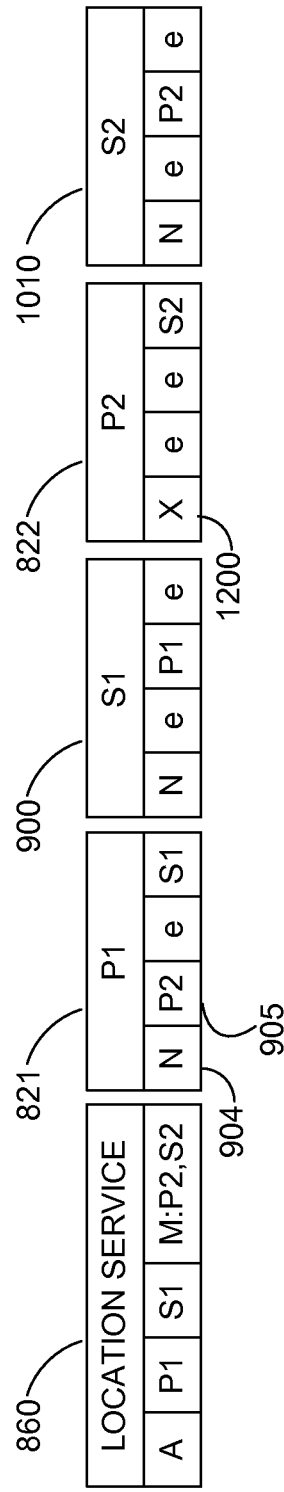
Figure 13:
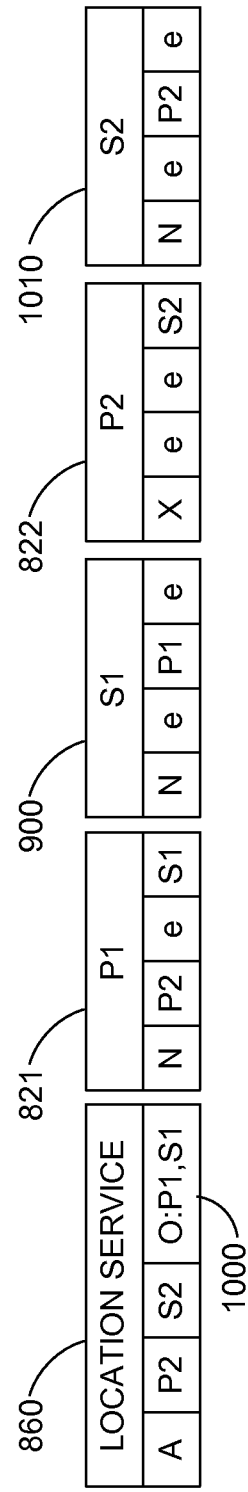

Turning to FIG. 11, the field 907 of the table of accounts 821 is updated with value "S1,P1" to reflect that P1 is now sending transactions to both S1 and P2 for replication of the storage account on both. At this point the storage stamps are not given instructions to conduct a migration, as the storage stamps are simply inter-stamp replicating at FIG. 11. (It is when the fields are configured as shown in FIGS. 12 and 13 that the storage stamps know to conduct migration.) In one instance, the change in value at the field 907 may result from a communication between ACUs. In another instance, the location service communicates to the ACU 811 in the primary storage stamp 801 and the ACU 812 in the primary storage stamp 802, individually, to set the states shown in FIG. 11. These separate communications (e.g., reference numerals 830 and 840 of FIG. 8) instruct P1 to begin replicating to P2, as P2 is now provisioned as a target for the migration of the storage account. Although P1 is replicating to P2, S1 is typically retained in case of failover during migration, thereby providing a current, up-to-date copy of the storage account at S1 for use in recovery (e.g., abrupt failover) upon an occurrence of a disaster at the geo-location where P1 and P2 reside.

Turning to FIG. 12, upon substantial completion of the bootstrap phase for P2 and S2 (i.e., P2 and S2 are fully up-to-date and caught up in terms of what is being sent over and what is being replayed), replication to S1 may be terminated and a clean failover from P1 to P2 may be triggered. In other words, substantial completion of the bootstrap phase may be gauged upon the location service polling the ACUs on the respective storage stamps to detect how up-to-date they are with respect to the storage account on P1. When P2 is caught up to P1 (i.e., exactly the same or within a reasonable limit), then a migration operation is triggered, which is carried out over a small timeframe.

Immediately prior to the migration operation, the location service sets P1 not to accept live traffic. In embodiments, setting P1 to refrain from accepting live traffic involves configuring the storage account on P1 to stop accepting replication requests and to flush remaining records to P2. In embodiments, "flushing" remaining records includes implementing a flush-send at P1 (i.e., clearing pending transactions from log(s) on P1 and delivering the pending transactions in rapid succession to P2) and a flush-replay at P2 (i.e., processing in rapid succession messages, or pending transactions from P1's flush-send, held in the GML of P2).

This change to P1 is reflected at field 904 that indicates P1 is no longer executing requests, field 905 that indicates live traffic is redirected to P2, and field 1200 that indicates P2 is now accepting live traffic and executing requests therein. That is, when P1 is flushing it's records to P2, the state of P2 is transitioned from a replication state to a live-traffic state. In one instance, this is done on a per partition basis. When each partition in P2 gets the last commitID from a flush-send operation from partitions in P1, it commits the last transactions during its flush-replay operation, and the partition on P2 can start taking traffic for that commitID's range partition. This allows each partition for the storage account to start accepting traffic for each partition range as it is flushed from P1 and replayed at P2. In another instance, a special message is sent from P1 to P2 to allow P2 to start taking live traffic. Feedback may be sent to the location service, which updates the state table 860 (see FIG. 13. Further, field 1000 of the state table may be updated to indicate that P1 and S2 are now considered orphaned with respect to the storage account.

Upon allowing P2 to take live traffic in FIG. 12, entries in the DNS table may be updated. In one instance, the DNS-table entries may indicate, for the given storage account, that P2 is provided with read and write access. Up until the point that P2 starts taking read/write traffic, the storage stamp P1 may provide a client read access while it is orphaned, prior to deletion, in order to allow the client to access data at P1 in the event of an unforeseen disaster at P2. It should be noted that, in some embodiments, the discussion above applies to situations when the secondary storage stamp is set-up to be read only. In these embodiments, customers may want to provide read-only access to S2 so that they can accomplishing the following: determine how long it takes to replicate the data between P1 and S2 and to monitor whether the timing of replication agrees with the terms of the SLA (e.g., writing data into P1 and seeing how long it takes to appear at S2); and access the another copy of data access right away at S2 in case there is any amount of unavailability at the primary. Further, read-only access may be provided to S2, as the primary and secondary are so geographically so far apart, reading from the S2 can provide higher bandwidth to clients that are geographically close to the S2 than if those clients were to read the data from the P1.

After updating the DNS table, or after some predefined retaining period, the remainder of the storage account presence on P1 and S1 is removed. Typically, the storage account is not deleted from P1 until the DNS table is updated, as live traffic is still actively being sent to P1 when the DNS table remains pointing P1 for receiving the client requests. However, in the interim between designating P1 as an orphan and scrubbing the storage account from P1 (e.g., while the DNS table is lagging in propagation of the change in designations), the table of accounts 821 for P1 is responsible ensuring that live traffic is redirected to P2.

Although a migration process that includes establishment of P2, replication to P2, and designation of P2 as the "primary" have been described, it should be understood and appreciated that other types of suitable migration procedures that do not involve a bootstrapping phase of replication in anticipation of migration may be used, and that embodiments of the migration are not limited to the generation of a new storage-account presence, as described herein. For instance, a migration may be implemented between an existing primary storage stamp (P1) and an existing secondary storage stamp (S1), which is actively replication data from P1 in the live-send phase. In this case, a client may trigger a switch-over between the designations attached to P1 and S1. By way of example, the client may desire the switch-over to address a situation where S1 is actually closer to the client's hosted service that requires write-access to storage-account data. When carrying out the migration, the bootstrapping phase of replication is cut-out, as S1 and substantially caught up to P1. Accordingly, migration may simply involve performing a flush between storage stamps participating in the migration, such as a flush-send a P1 and a flush-replay at S1. Upon completion of the flush, the ACU at P1 updates its table of accounts to reflect that P1 is no longer accepting live traffic and to reflect that, for the given storage account, live traffic is redirect to S1. Further, upon completion of the flush, the ACU at S1 updates its table of accounts to reflect that S1 is now accepting live traffic and, potentially, sending transactions on to any other secondary storage stamps, such as P1.

Or, P1 may be designated as a secondary storage stamp (e.g., assuming the data at P1 is intact and not corrupted by a failure) in order to save the processing resources involved in creating a new secondary storage stamp. In this way, once S1 has completed replaying the flushed transactions, the ACU at P1 updates its table of accounts to reflect that P1 is now accepting transactions from S1 for replay. Further, upon completion of the flush, the ACU at S1 updates its table of accounts to reflect that S1 is now sending transactions to P1 as part of the live-send phase of replication. As such, this method of swapping a primary storage stamp with an existing secondary storage stamp avoids implementing the bootstrapping phase and takes advantage of a natural expansion inherent within the underlying architecture of the system.

Embodiments of the present invention further involve a system and method for conducting a failover. As with migration, failover is generally related to transitioning data on a secondary storage stamp, which is presently functioning as a data store, into a primary storage stamp that is capable of providing read and write access to a client upon request. As will be discussed in detail, there are two distinct classes of failover: clean failover and abrupt failover. "Clean failover" generally refers to an anticipated transition from a primary to a secondary storage stamp. In embodiments, clean failover involves updating entries within a DNS table (see reference numeral 400 of FIG. 4) to reflect that the secondary storage stamp is now designated as the new primary storage stamp and redirecting live traffic from the primary storage stamp to the secondary storage stamp until propagation of the update to the DNS-table entries is complete. Accordingly, employing the DNS table for implementing the clean failover promotes seamless data-access to the storage account, as the uniform resource identifiers (URIs) within the DNS table are held constant. That is, a particular URI that points to the primary storage stamp for a given storage account may be be recycled to point to the new primary storage stamp (i.e., former secondary storage stamp) upon propagating the updates to the DNS table.

In other embodiments, the DNS update is not required to redirect the live traffic upon encountering a failover. In these embodiments, where a subset of data for a storage account is the subject of a partial failover, a balance of the data for the storage account is served from its original source stamp, while the subset of data (e.g., failed or lost data) is redirected to another stamp. As such, other techniques beyond the DNS (e.g., using a global traffic manager/software solution) for redirecting the live traffic associated with the subset of data may be employed.

"Abrupt failover" generally refers to an unanticipated disaster at a geo-location of a primary storage stamp that triggers a transition from the primary to a secondary storage stamp. In embodiments, abrupt failover involves interrupting the flow of live traffic to the primary storage stamp, flushing and replaying the remaining transactions on the secondary stamp, and then cancelling the remaining transactions pending replay within the secondary storage stamp that will not be replayed. Further, abrupt failover may involve replaying transactions of the GML—in a sequential manner past the commitID during a flush-send up until a point where data could become inconsistent and then stopping at that point. Accordingly, these procedures that are carried out during a abrupt failover maintain high availability of storage-account data for the client and minimize or prevent loss of storage-account data. Both clean fail over and abrupt failover will be discussed with more specificity below with reference to FIGS. 14 and 15.

In one instance, for an abrupt failover due to a disaster, the secondary storage stamp will commit and replay all of the remaining transactions in its GML after the latest commitID that was sent as part of the failover. This process of committing and replying all of the remaining transactions allows the secondary storage stamp to fully catch up and be strongly consistent with the primary storage stamp after the failover completes. This process also allows the synchronous replication, having an eventual consistency replication approach, to actually provide strong consistency when a failover occurs due to disaster recovery. In other words, this process allows the new primary storage stamp (e.g., old destination or secondary storage stamp) for the data to substantially provide a strongly consistent view of the data, even after failover. Accordingly, when performing synchronous geo-replication, the new primary storage stamp is equipped to replay all transactions thereon (i.e., there will be no gaps in data), thereby allowing strong consistency to be provided after failover.

A discussion of achieving synchronous replication with "strong consistency" on failover will now commence. Data is initially received at a primary storage stamp from a client. The data may then be written to a log of the primary storage stamp for eventual committal. The data is then annotated with a record, such as a unique identifier, which facilitates the replay of the data at a secondary storage stamp. The annotated data is communicated from the primary to the secondary storage stamp to be written to a log thereon. Upon receiving an acknowledgment that the secondary storage stamp has written the data to a log, the primary storage stamp may commit the data and communicate an acknowledgment of success back to the client. In a strong consistency approach, the primary storage stamp may wait to send the acknowledgement of success to the client until it has received an acknowledgment that the secondary storage stamp has not only written, but also committed, the data.

A system for carrying out embodiments of an exemplary failover will now be described with reference to the computing environment 800 of FIG. 8. Initially, as will be gleaned from the discussion below, clean failover and migration share some of the same features. For instance, clean failover generally represents an active swap of roles between a primary and secondary storage account, while the primary storage stamp is considered healthy, with the goal of maintaining high availability of the storage-account data.

The system includes at least the primary storage stamp 801, the destination (secondary) storage stamp 802, and the location service 300. The primary storage stamp 801 may have residing thereon one or more source partitions 831, whose operation is affected by the settings 841. Initially, prior being triggered to perform the failover, the source partitions 831 may accept live traffic and may sending transactions (see reference numeral 525 of FIG. 5) to appropriate destination partitions. In embodiments, sending the transactions promotes carrying out a replication from the primary 801 to the destination storage stamp 802, as more fully discussed above.

Generally, the destination storage stamp 802 may have residing thereon one or more destination partitions 832, whose operation is affected by the settings 841. In embodiments, the destination partitions are configured to replay the transactions such that the replicated data substantially mirrors content of the initial data. Further, the primary and destination storage stamps 801 and 802 may have respective ACUs 811 and 812 for updating respective tables of accounts 821 and 822. As discussed above, the updates to the tables of accounts 821 and 822 may be triggered by the location service 300. In operation, the updates to the tables of accounts 821 and 822 may influence how a particular storage stamp interacts with the client and the other storage stamps of the system.

Further, the location service 300 may be disposed to invoke changes to the configuration of the source partitions during a failover. Invoking these changes may involve the location service 300 sending a message 830 to the first ACU 811 that updates the table of accounts 821 and relays parameters 835 to update the settings 841. Upon updating the settings 841, the location service 300 may instruct the source partitions 831 to refrain from accepting live traffic. Or, the update to the table of accounts 821 may affect the status of the primary storage stamp 801 such that it will stop processing live traffic and, eventually, redirect the live traffic to the destination storage stamp 802. Either way, the primary storage stamp 801 is disabled from processing new requests from the client for the data involved in the failover.

Further, upon updating the settings 841, the location service 300 may instruct the source partitions 831 to independently perform a flush-send operation. As used herein, the phrase "flush-send operation" broadly refers to accelerating a rate at which pending messages, which are currently held at the partitions 831, are sent to the destination storage stamp 802, as well as flushing every last transaction from the primary partitions to the destination partitions that the primary can. In this way, the flush-send operation promotes flushing the remaining pending transactions when performing a failover to ensure that there is little to no data loss and that everything is consistent for the storage account. Thus, one purpose for flushing (i.e., flush-send and flush-replay operations) is to perform the clean failover for a given storage account very rapidly in order to reduce a period of storage-account unavailability. By way of example, flushing may allow the system to meet an SLA requirement for concluding the clean failover in no less than a minute. For some failovers, a subset of the data is lost on the primary, so a flush-send operation is done for the data partitions that are still alive, the system is not able to do a flush-send operation for the partitions whose data is lost. This means that the clean failover is done for the partitions that still have data on the primary, whereas abrupt failover is done for the partitions data that is no longer accessible on the primary.

Further, invoking changes as part of the clean failover may involve the location service 300 sending a message 840 to the second ACU 812 that updates the table of accounts 822 and relays parameters 845 to update the settings 842. Upon updating the settings 842, the location service 300 may instruct the destination partitions to independently perform a flush-replay operation. As used herein, the phrase "flush-replay operation" broadly refers to increasing a rate at which pending transactions are replayed by the partitions 832 on the destination storage stamp 802. In some embodiments, the flush-replay operation refers to trying to replay every last instruction it receives from the primary partition on clean failover, and on abrupt failover. In other embodiments, the flush-replay operation refers to replaying instructions past the commitID up until, but not past, a recognition that there may be missed transactions (e.g., originating from the primary) in terms of replaying the instructions for consistency. In this way, the flush-replay operation promotes aggressively executing pending transactions in order to catch the destination storage stamp 802 to the level of the primary storage stamp 801, as well as to maintain the destination storage stamp as consistent as possible with the primary storage stamp.

Upon an individual destination partition (of the destination partitions 833) substantially completing the flush-replay operation, the individual destination partition may be allowed to commence accepting live traffic prior to others of the destination partitions. That is, as the destination partitions 832 separately conclude flush-replay with respect to the pending transactions, the destination partitions 832 may individually begin accepting live traffic. By way of example, upon key ranges of the destination partitions 832 becoming caught up to the corresponding key ranges of the source partitions 831, the caught-up key ranges may communicate with the settings 841 in order to enable receiving live traffic specifically thereto. Further, upon the key ranges of the destination partitions 832 becoming caught up, the caught-up key ranges may perform a handshake to commence the acceptance of live traffic. In one instance, the handshake involves the destination storage stamp 802 sending an acknowledge that indicates it is assuming responsibility for the caught-up key ranges, wherein the acknowledgement is sent to the primary storage stamp 801 in reply to a special transaction soliciting a status of the failover. Eventually, upon each of the destination partitions 832 substantially completing the flush-send operation, the primary storage stamp 801 may be designated as a new secondary storage stamp and the destination storage stamp 802 may be designated as a new primary storage stamp.

In one instance, a GML (e.g., see reference numeral 545 of FIG. 5) is provided and associated with the destination partitions 832, respectively, where the GML is configured for maintaining the pending transactions in a sequential ordering. As discussed above, the GML may be associated with the individual destination partitions. In operation, upon the pending transactions maintained in the GML being replayed by an individual destination partition, the information conveyed by the transactions is committed as part of the replicated data and is available for read access. At this point, upon clearing out the GML, the individual destination partition may be enabled to receive and process live traffic. Further, upon receiving and processing the live traffic, the individual destination partition may be enabled to commence sending transactions to the source partitions 831, or other secondary stamps, for carrying out replication thereto.

Figure 14:
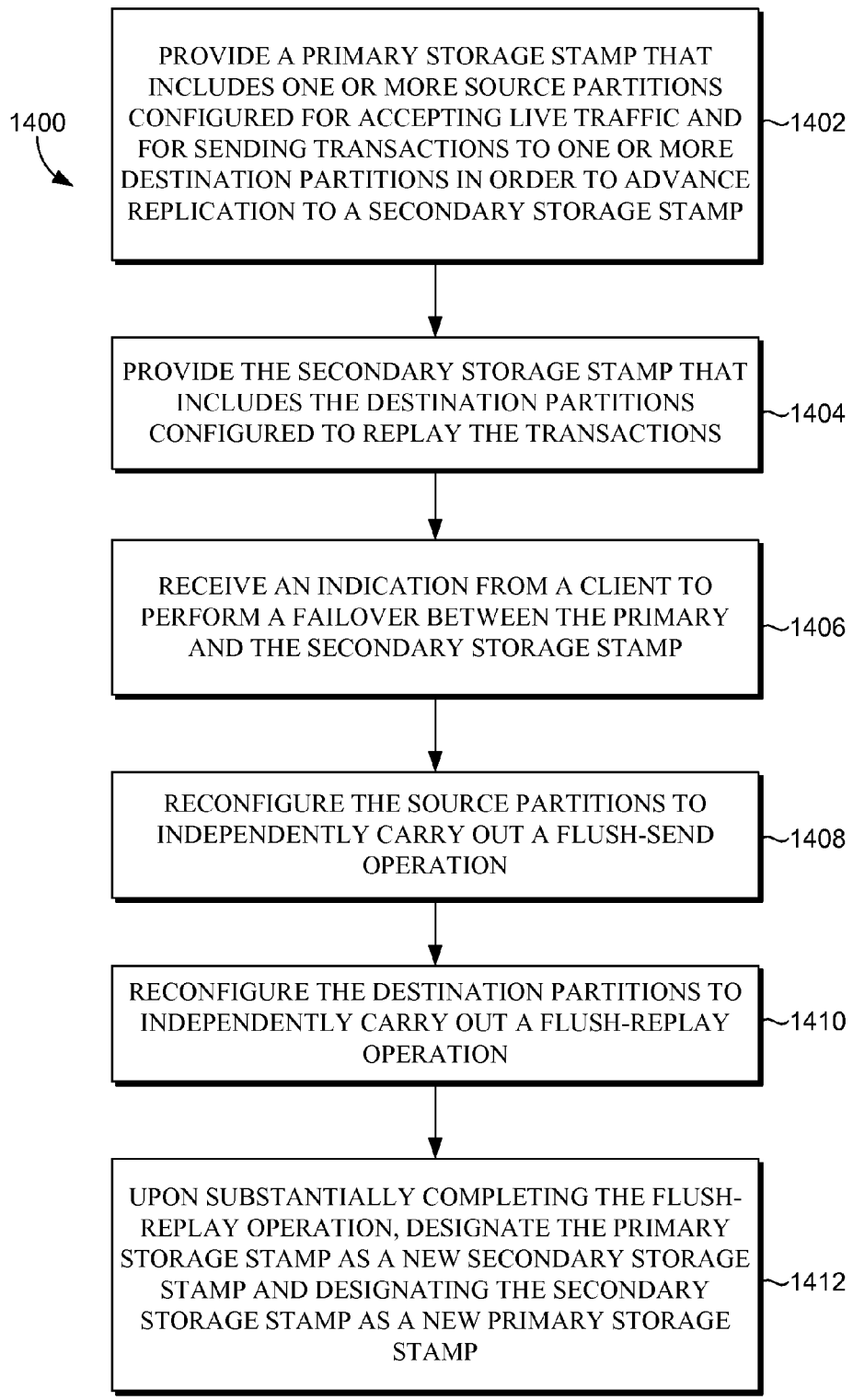
FIG. 14 depicts a methodology for invoking a clean failover of a storage account residing on storage stamps within the distributed computing environment, in accordance with embodiments of the present invention.

Turning now to FIG. 14, a methodology 1400 for invoking a clean failover of a storage account residing on storage stamps within the distributed computing environment is shown, in accordance with embodiments of the present invention. It should be noted that although the terms "step" and "block" are used herein below to connote different elements of the methods employed for carrying out embodiments of the present invention, the terms should not be interpreted as implying any particular order among or between various steps herein disclosed unless and except when the order of individual step. In embodiments, the methodology 1400 includes providing a primary storage stamp and a secondary storage stamp. As depicted at block 1402, the primary storage stamp may include one or more source partitions configured for accepting live traffic and for sending transactions to one or more destination partitions in order to advance replication to a secondary storage stamp. As depicted at block 1404, the secondary storage stamp may include the destination partitions configured to replay the transactions.

In embodiments, as depicted at block 1406, the methodology 1400 may further include receiving an indication from a client to perform a failover between the primary and the secondary storage stamp. In other embodiments the storage system may decide to automatically perform the failover. In instances of receiving the indication for performing a failover, the client may be provided operational privileges to manually control or trigger the clean failover. By way of example, a set of options that allow for modifying a policy that controls aspects of the failover may be exposed to the client. Those failover aspects that are controlled by the policy comprise at least one of an identity of a storage stamp to be a target of the failover or whether the failover is to be automatically triggered upon an occurrence of specified conditions. Although various different failover aspects of the policy have been described, it should be understood and appreciated that other types of suitable options that influence the manner the failover is carried out may be exposed to the client, and that embodiments of the present invention are not limited to those options described herein. For instance, additional options may be available to allow the client to select one or more of the following: whether to conduct a clean or abrupt geo-failover, whether to add a new secondary storage stamp for a given storage account, and a level of how aggressive the failover should be conducted (e.g., using a delay timer that allows customers to specify an amount of time between a geo-disaster and commencement of a failover).

It should be noted that a clean failover can involve a situation where some data may still be accessible on the primary storage stamp, while a subset of data may not be available. For the data that is still accessible, a clean failover may be performed. But, for the unavailable data, an abrupt failover is performed. In embodiments, the abrupt failover parallels the steps of the clean failover steps except for the flush-send operation, as the subset of the data that would be involved in the flush-send operation is no longer accessible on the primary storage stamp.

Upon receiving the indication to failover (e.g., clean failover), the partitions on the primary and secondary storage stamps may be reconfigured to perform flush operations in order to ensure no data-loss during the failover. For instance, as depicted at block 1408, reconfiguring the source partitions may include requesting the source partitions to independently carry out a flush-send operation. In embodiments, as discussed above, the flush-send operation involves distributing pending messages to the destination partitions as a group. As depicted at block 1410, reconfiguring the destination partitions may include requesting the destination partitions to independently carry out a flush-replay operation. In embodiments, the flush-replay operation involves aggressively replaying transactions currently pending at the destination partitions. Typically, the flush-replay operation commences on the destination partitions independently of the flush-send operation on the source partitions (e.g., do not necessarily wait for the flush-send to be done before doing the flush-replay). Accordingly, these operations are typically performed in parallel.

Upon substantially completing the flush-replay operation, the methodology 1400 may further involve designating the primary storage stamp as a new secondary storage stamp and designating the secondary storage stamp as a new primary storage stamp for the failed over data, as depicted at block 1412. Advantageously, by selecting the former primary to be the new secondary storage stamp, the bootstrapping phase of replication may be reduced or even avoided upon commencing replication. In other embodiments, as discussed above, these designations of whether the storage stamps are "primary" or "secondary" may occur with respect to just one storage account hosted on the storage stamps, or with respect to a subset of the storage account's data residing on the storage stamps.

In another embodiment, upon receiving the indication from the client to perform the failover, the primary storage stamp may be configured to redirect live traffic from the client to the secondary storage stamp. This may involve updating the DNS table (see reference numeral 400 of FIG. 4), thereby ensuring the DNS table reflects that the primary storage stamp is designated as the new secondary storage stamp and that the secondary storage stamp is designated as the new primary storage stamp. In other embodiments, only a subset, or portion, of the data is selected to be the subject of a failover. In these embodiments, the DNS is not updated and, instead, the primary storage stamp remains designated as the "primary" for the data it holds. In operation, the primary storage stamp just forwards to the destination storage stamp the requests for the subset of data on which the failover occurred.

In an exemplary embodiment, the location service starts the failover after it polls the primary and/or secondary storage stamp to determine that the inter-stamp replication lag is small (e.g., below a predefined threshold) in order to ensure that the failover may be performed rapidly. At the same time, the location service will instruct the source stamp to perform a flush-send operation and redirect the traffic associated with the data, which is the subject of the failover, to the destination stamp. Further, the location service may instruct the destination storage stamp to perform a flush-replay and to update the DNS entries for the data that is the subject of the failover.

In other embodiments, the location service may recognize that the flush-replay operation is substantially complete by polling the destination partitions. When it is recognized that the flush-replay operation is substantially complete, the location service may then instruct the DNS table to propagate the update. In an exemplary embodiment, the primary storage stamp may be configured to continue redirecting the live traffic even upon communicating the update to the DNS table (e.g., for a predefined retaining period) to allow for full propagation of the update throughout the DNS table.

Figure 15:
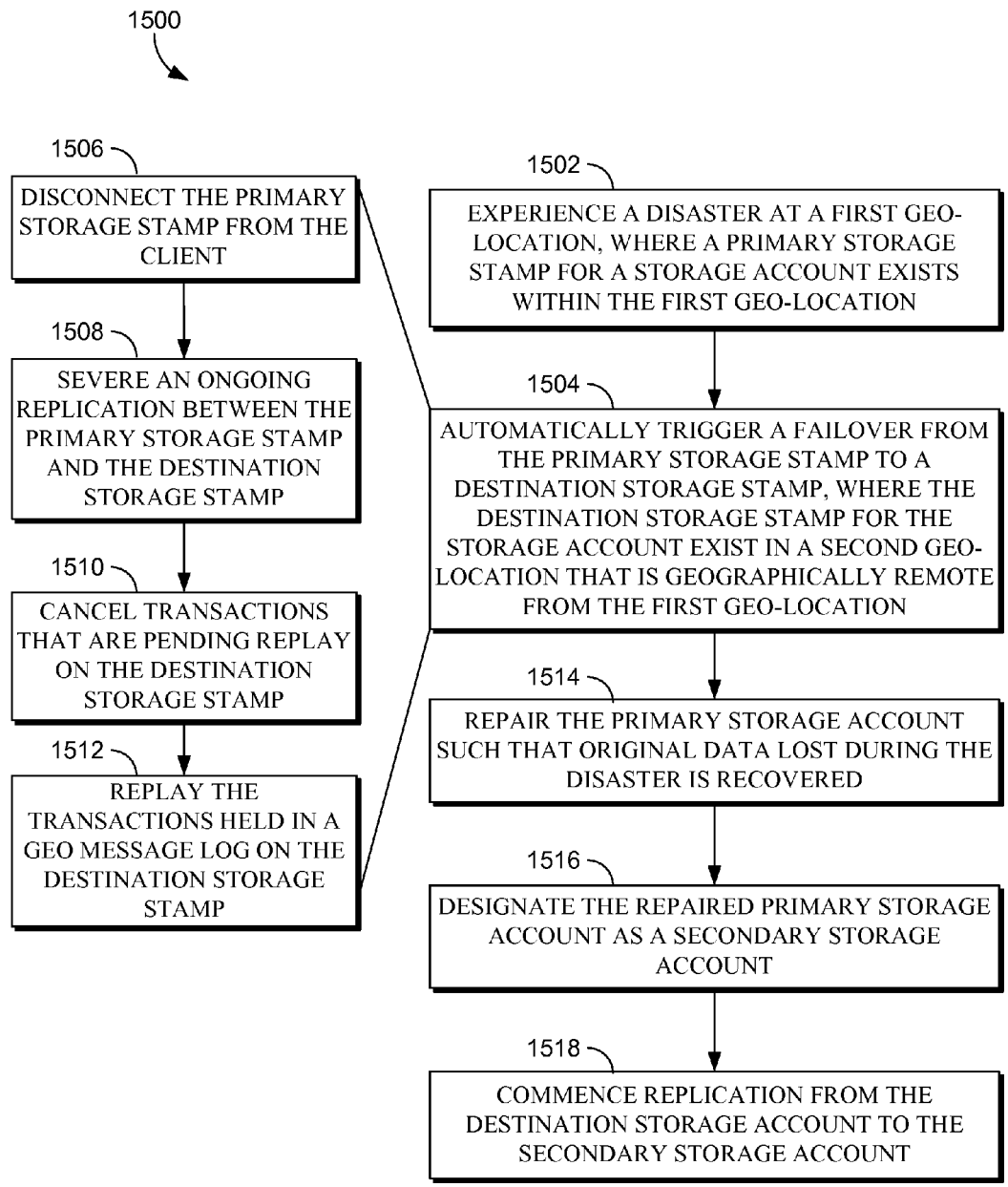
FIG. 15 depicts a methodology for a method for implementing a abrupt failover of a client's storage account from a primary storage stamp to a destination storage stamp, in accordance with embodiments of the present invention.

With reference to FIG. 15, a methodology 1500 is depicted for implementing a abrupt failover of a client's storage account from a primary storage stamp to a destination storage stamp, in accordance with embodiments of the present invention. Initially, the primary storage stamp associated with the storage account may exist within a first geo-location, while the destination storage stamp for the storage account may exist within a second geo-location that is geographically remote from the first geo-location. Upon experiencing a disaster at the first geo-location, as depicted at block 1502, the methodology 1500 may involve automatically triggering a failover of the storage accounts on the primary storage stamp to their destination storage stamps in accordance with a predefined policy, as depicted at block 1504. For instance, when data is lost on the primary storage stamp, the lost data may be associated with many storage accounts on many destination storage stamps and, thus, the failover may occur between one primary storage stamp and various destination storage stamps. Because there is typically a data unavailability data loss inherent within a disaster (e.g., the most recent minutes of updates to the storage account), the location service will automatically trigger the failover, based on the predefined policy, to head off addition unavailability and data loss.

By way of example, the predefined policy may dictate that failover is automatically triggered either immediately upon detecting the disaster or upon undergoing a pre-specified period of time in which there is unavailability, while it is being determined if the primary can be recovered or not. This policy may be modified by the client. When the client chooses to automatically trigger the failover immediately upon detecting unavailability or a disaster, the client is revealing they care more about storage-account data availability, as the new primary storage stamp (former secondary storage stamp) will likely still be online in a different geo-location at the sacrifice of losing some delta changes that have not been geo-replicated. In contrast, when the client chooses to automatically trigger the failover upon undergoing a pre-specified period of unavailability, the client is revealing they care more about trying to bring the primary completely back without any data loss if possible. This delay in deciding to failover or not is used to ensure all data (e.g., deltas to the storage account) that still may exist are recovered on the primary to potentially avoid having to do the failover.

In embodiments, an option that allows customers to control exactly when to fail over is provided (e.g., exposing a delay time). For instance, the option may include a delay timer that provides customers with the ability to specify, as part of their storage-account configuration, the maximum amount of time to wait before triggering a failover. Thus, each customer is enabled to specify the maximum amount of time separately, such that they can configure a tradeoff between unavailability while trying to restore the primary storage stamp versus immediately triggering a failover, thereby losing the recent delta changes to data associated with their storage account. Typically, when a live-site incident occurs (e.g., disaster or significant unavailability), the delay timer is started. The failover is triggered when the delay timer elapses for the storage account, if the primary storage stamp is not repaired by that point. If the primary storage stamp is repaired by the elapse of the delay timer, a failover is not triggered.

When a particular customer cares about availability more than data loss, they may set the delay timer to failover quickly upon detecting a live-site incident (e.g., specifying a short maximum amount of time until failover). If the particular customer cares more about data loss than availability, they may allow time for administrator so the storage account to thoroughly attempt to restore the lost data on the primary storage stamp before triggering the failover (e.g., specifying a long maximum amount of time until failover). For this latter customer, they would rather avoid any failover at all and if the primary storage stamp is resurrected without data loss, such that a failover is avoided.

In an exemplary embodiment, the failover may include the following steps: disconnecting the primary storage stamp from the client (see block 1506) and severing an ongoing replication between the primary storage stamp and the destination storage stamp such that the communication of transactions therebetween is interrupted (see block 1508). In this way, any additional changes to the storage account redirected from the failed primary storage stamp to prevent any further updates from being both lost and non-replicated. Further, read and write access to the failed primary storage stamp may be cut off, thus, quarantining the failed primary storage stamp until repairs are made thereto.

Further, as depicted at block 1512, failover may include replaying a history of transactions maintained by a GML on the destination storage stamp. In one instance, the GML replayed until a gap in a sequence of transactions is detected. Upon detecting the gap, replay is stopped and the destination partition can start taking live traffic. In other embodiments, if the old primary storage stamp still holds data thereon, those subsequent transactions within the sequence are pulled from a reliable source to ensure not corrupted data is replayed. In addition we may repair the primary storage stamp as well, in a similar way to the bootstrapping phase of replication, in order to repair the primary storage stamp for use as a backup, as discussed immediately below.

As depicted at block 1514, the primary storage stamp may be repaired such that original data lost during the disaster is recovered and replayed thereon to bring the primary storage stamp to a current level. Typically, the primary storage stamp in this case represents the original source account location on which the data was hosted. This repaired primary storage stamp may be designated as a secondary storage stamp, as depicted at block 1516.

Eventually, replication from the destination storage stamp to the secondary storage stamp may be commenced to provide a new backup stamp, as depicted at block 1518. However, if the primary storage stamp is substantially lost during the disaster, and the client has indicated that geo-replication is enabled for the given storage account, the location service may provision the account on a different storage stamp to act as a secondary and commence a bootstrap phase of inter-stamp replication between the new primary storage stamp and the new (secondary) storage stamp.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. While certain methodologies have been described in a particular sequence, it is contemplated that those activities may be performed in a variety of order and sequences.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method in a distributed environment utilizing a processor and memory for invoking a clean failover of a storage account residing on storage stamps within the distributed computing environment, the method comprising:

providing a primary storage stamp that includes one or more source partitions configured for accepting live traffic and for sending messages, to one or more destination partitions in order to advance replication to a secondary storage stamp, wherein messages comprise transactions;

providing the secondary storage stamp that includes the one or more destination partitions configured to replay the transactions of the messages;

performing a failover between the primary and the secondary storage stamp for a subset of the data on the primary stamp, wherein the failover is an anticipated transition from the primary storage stamp to the secondary storage stamp;

requesting that the one or more source partitions attempt to independently carry out a flush-send operation, wherein the flush-send operation involves distributing pending messages at the primary storage stamp to the one or more destination partitions as a group, wherein pending messages comprise logged messages at primary storage stamp; and reconfiguring the one or more destination partitions to independently carry out a flush-replay operation, wherein the flush-replay operation involves aggressively replaying the transactions of at least the pending messages received at the one or more destination partitions.

2. The method of claim 1, further comprising disabling the primary storage stamp from processing live traffic for the subset of data involved within the failover during the flush-send operation.

3. The method of claim 1, wherein, upon substantially completing the flush-replay operation, designating the secondary storage stamp as a new primary storage stamp.

4. The method of claim 1, wherein, upon substantially completing the flush-replay operation, designating the primary storage stamp as a new secondary storage stamp.

5. The method of claim 1, wherein the flush-replay operation commences on the one or more destination partitions incident to a substantial completion of the flush-send operation on the one or more destination partitions.

6. The method of claim 1, further comprising, upon an individual destination partition substantially completing the flush-send operation, allowing the individual destination partition to complete flush-replay and then commence accepting live traffic prior to others of the one or more destination partitions.

7. The method of claim 1, further comprising, reconfiguring the primary storage stamp to redirect live traffic from the client to the secondary storage stamp for the data involved in the failover.

8. The method of claim 7, further comprising, initiating an update to a table at a domain name server (DNS), wherein the DNS table is updated to reflect that the primary storage stamp is designated as the new secondary storage stamp and that the secondary storage stamp is designated as the new primary storage stamp.

9. The method of claim 8, further comprising maintaining the redirect reconfiguration of the primary storage stamp for a predefined retaining period to allow for propagation of the update throughout the DNS table.

10. The method of claim 1, further comprising providing a location service that is communicatively coupled to a first account control unit (ACU) running on the primary storage stamp and to a second ACU running on the secondary storage stamp.

11. The method of claim 10, wherein reconfiguring the one or more source partitions comprises receiving a message from the location service at the first ACU, wherein the message instructs the first ACU to update a first table of accounts residing on the primary storage stamp, wherein the first table of accounts governs whether the one or more source partitions are actively participating in a failover, a replication, or neither.

12. The method of claim 11, wherein reconfiguring the one or more destination partitions comprises receiving a message from the location service at the second ACU, wherein the message instructs the second ACU to update a second table of accounts residing on the secondary storage stamp, wherein the second table of accounts governs whether the one or more destinations partitions are actively participating in a failover, a replication, or neither.

13. The method of claim 1, wherein the primary and secondary storage stamps exist within a single geo-location such that the failover occurs internal to the geo-location.

14. The method of claim 1, wherein the primary and secondary storage stamps exist in geo-locations that are geographically remote with respect to one another, and wherein the failover results in designating a new primary storage stamp that is external to a geo-location of the primary storage stamp.

15. The method of claim 1, further comprising triggering the performance of the failover upon the storage system deciding to carry out a failover or upon receiving an indication from a client, wherein receiving an indication from the client involves exposing to the client a control that allows for manually triggering the failover.

16. The method of claim 1, exposing to the client a set of options that allow for modifying a policy that controls aspects of the failover, wherein the failover aspects that are controlled by the policy comprise an identity of a storage stamp to be a target of the failover.

17. The method of claim 16, wherein the failover aspects that are controlled by the policy comprise whether the failover is to be automatically triggered upon an occurrence of specified conditions, and wherein one of the specified conditions includes exposing a delay timer that allows customers to specify a maximum amount of time between experiencing a disaster and automatically performing the failover.

18. One or more computer storage device having computer-executable instructions embodied thereon, that when executed by a computing system having a processor and memory, cause the computing system to perform a method for implementing an abrupt failover of a client's storage account from a primary storage stamp to a destination storage stamp, the method comprising:
experiencing a disaster at a first geo-location, wherein the primary storage stamp for the storage account exists within the first geo-location;
automatically triggering a failover from the primary storage stamp to the destination storage stamp in accordance with a predefined policy, wherein the destination storage stamp for the storage account exist in a second geo-location that is geographically remote from the first geo-location, and wherein the failover comprises:
(a) disconnecting the primary storage stamp from taking client requests;
(b) ensuring that an ongoing replication between the primary storage stamp and the destination storage stamp is severed such that the communication of transactions therebetween is interrupted; and
(c) replaying the transactions held in a geo message log (GML) on the destination storage stamp that were delivered prior to experiencing the disaster: and
bootstrapping the storage account from the destination storage stamp to a third storage stamp, wherein bootstrapping comprises:
generating a log of incoming changes to the destination storage stamp while replicating a copy of the storage account to the third storage stamp; and
updating the third storage stamp using the log of incoming messages.

19. The media of claim 18, wherein replaying the transactions held in the GML on the destination storage stamp that were delivered prior to experiencing the disaster comprises:
committing the transactions remaining in the GML after detecting a latest commitID provided as part of the failover;
replaying the remaining transactions held in the GML, thereby allowing data within the destination storage stamp to be strongly consistent against data within the primary storage stamp upon completion of the failover.

20. A computer system within a distributed networking environment for conducting a clean failover for a storage account, the system comprising:
a primary storage stamp that includes one or more source partitions that represent a key range of initial data associated with a storage account, wherein the one or more source partitions are configured for accepting live traffic and for sending transactions to one or more destination partitions for carrying out replication thereto;
a secondary storage stamp that includes the one or more destination partitions that represent a key range of replicated data associated with the storage account, wherein the one or more destination partitions are configured to replay the transactions such that the replicated data substantially minors content of the initial data; and
a location service for managing the storage account based on a domain name service (DNS) storage namespace mapping to the storage account, wherein the storage account specifies the primary storage stamp and the second storage stamp for the storage account, and wherein the location service is further configured for managing partitions independently of each other for invoking changes to the configuration of the one or more source partitions and for invoking changes to the configuration of the one or more destination partitions upon receiving an indication to failover from the primary storage stamp to the secondary storage stamp, wherein invoking changes to implement the failover comprises:
(a) instructing the one or more source partitions to refrain from accepting live traffic;
(b) instructing the one or more source partitions to independently perform a flush-send operation that attempts to flush the transactions remaining at the partitions to the secondary storage stamp;

(c) instructing the one or more destination partitions to independently perform a flush-replay operation that replays pending transactions at the secondary storage stamp;
(d) upon an individual destination partition, of the one or more destination partitions, substantially completing the flush-send operation, allowing the individual destination partition to commence accepting live traffic prior to others of the one or more destination partitions; and
(e) upon each of the one or more destination partitions substantially completing the flush-send operation, designating the secondary storage stamp as a new primary storage stamp for the set of data failed over.

* * * * *